United States Patent
Williams

(10) Patent No.: US 12,351,351 B2
(45) Date of Patent: *Jul. 8, 2025

(54) DOSER MECHANISMS

(71) Applicant: Altria Client Services LLC, Richmond, VA (US)

(72) Inventor: Dwight David Williams, Powhatan, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,644

(22) Filed: Sep. 8, 2023

(65) Prior Publication Data

US 2023/0415932 A1    Dec. 28, 2023

Related U.S. Application Data

(63) Continuation of application No. 17/466,460, filed on Sep. 3, 2021, now Pat. No. 11,858,673.

(51) Int. Cl.
    *B65B 3/30*   (2006.01)
    *B65B 3/08*   (2006.01)
    *G01F 13/00*  (2006.01)

(52) U.S. Cl.
    CPC .............. *B65B 3/305* (2013.01); *B65B 3/08* (2013.01); *G01F 13/005* (2013.01)

(58) Field of Classification Search
    CPC ........ B65B 1/12; B65B 1/42; B65B 2220/06; B65B 29/00; B65B 3/08; B65B 3/305;
    (Continued)

(56) References Cited

U.S. PATENT DOCUMENTS 2,913,145 A    11/1959   Hopkins et al.
4,629,093 A    12/1986   Le Molaire
                         (Continued)

FOREIGN PATENT DOCUMENTS

CN    212382500 U    1/2021
DE    10243007 A1    3/2004
                    (Continued)

OTHER PUBLICATIONS

Machine Translation of Takaha to WO-2004096644-A1 (Year: 2004).*

(Continued)

*Primary Examiner* — Anna K Kinsaul
*Assistant Examiner* — Himchan Song
(74) *Attorney, Agent, or Firm* — HARNESS, DICKEY & PIERCE, P.L.C.

(57) ABSTRACT

A doser mechanism includes a cylindrical shell, an auger conveyor, and a check valve. The cylindrical shell includes a hollow cylinder and an end plate. The hollow cylinder at least partially defines an internal enclosure extending between first and second ends of the hollow cylinder, a first opening at the first end, and a second opening through a thickness of the hollow cylinder. The end plate covers the second end. The auger conveyor includes an auger at least partially extending through the internal enclosure through the first end. The check valve has a valve member configured to selectively cover the second opening. The check valve may cause the valve member to move between a rest position and an open position to cover or expose the second opening in response to a magnitude of a force applied to the valve member from the internal enclosure through the second opening.

15 Claims, 15 Drawing Sheets

(58) Field of Classification Search
CPC ..... B65B 51/16; B65B 51/306; B65B 57/145; B65B 61/06; B65B 65/006; B65B 65/02; B65B 9/207
See application file for complete search history.

(56) References Cited

U.S. PATENT DOCUMENTS

| | | | | |
|---|---|---|---|---|
| 5,709,322 | A * | 1/1998 | Ricciardi | G01F 13/005 |
| | | | | 222/413 |
| 6,266,511 | B1 * | 7/2001 | Murakami | G03G 21/105 |
| | | | | 222/DIG. 1 |
| 7,409,180 | B2 * | 8/2008 | Seo | G03G 21/105 |
| | | | | 399/258 |
| 8,281,959 | B2 | 10/2012 | Luchinger | |
| 8,413,954 | B1 | 4/2013 | Burrow | |
| 8,855,528 | B2 * | 10/2014 | Fujimura | G03G 15/0893 |
| | | | | 399/257 |
| 2004/0161272 | A1 * | 8/2004 | Park | G03G 21/12 |
| | | | | 399/358 |
| 2005/0155845 | A1 * | 7/2005 | Webb | B65G 65/46 |
| | | | | 198/669 |
| 2006/0144798 | A1 | 7/2006 | Dixon et al. | |
| 2013/0306672 | A1 | 11/2013 | White | |
| 2014/0112832 | A1 * | 4/2014 | Lacy | B01J 4/005 |
| | | | | 422/310 |
| 2017/0000288 | A1 * | 1/2017 | Dubief | A47J 31/404 |
| 2020/0156028 | A1 * | 5/2020 | Weinekoetter | B01F 35/832 |
| 2020/0173125 | A1 | 6/2020 | Grimes et al. | |
| 2020/0208749 | A1 * | 7/2020 | Kracke | F16K 17/048 |
| 2021/0039818 | A1 | 2/2021 | Futase | |
| 2021/0347506 | A1 | 11/2021 | Reiser et al. | |
| 2023/0415932 | A1 * | 12/2023 | Williams | B65B 9/207 |

FOREIGN PATENT DOCUMENTS

| | | | | |
|---|---|---|---|---|
| EP | 0031851 B1 | 6/1984 | | |
| WO | WO-2004096644 A1 * | 11/2004 | | B65B 37/20 |

OTHER PUBLICATIONS

International Preliminary Report on Patentability and Written Opinion dated Mar. 14, 2024 for corresponding International Application No. PCT/US2022/042174.

"Ropak Stikpak," Web page <<https://ropak.com/stikpak/>>, 14 pages, retrieved on Mar. 29, 2021.

International Search Report and Written Opinion thereof dated Feb. 23, 2023 for corresponding International Application No. PCT/US2022/042174.

Notice of Allowance dated Jun. 8, 2023, issued in corresponding U.S. Appl. No. 17/466,460.

* cited by examiner

DOSER MECHANISMS

CROSS-REFERENCE TO RELATED APPLICATION

This application is a continuation of U.S. application Ser. No. 17/466,460, filed Sep. 3, 2021, the disclosure of which is incorporated herein by reference in its entirety.

BACKGROUND

Field

The present disclosure relates to portioning of granular materials, including powder materials, and more particularly to portioning granular materials to provide rapid, economical, and efficient portioning of the granular materials to provide ("manufacture") portions ("instances") of granular material having a controllable volume.

Description of Related Art

Some products, including some consumer goods, include packaged portions ("portioned instances") of a granular material (also referred to herein as simply a "material"). In some cases, such portioned instances may be produced ("provided," "manufactured," etc.) based on portioning (e.g., dividing) and/or supplying a relatively large ("bulk") instance of the material into multiple smaller portioned instances and packaging the portioned instances.

SUMMARY

According to some example embodiments, a doser mechanism may include a cylindrical shell including a hollow cylinder and an end plate. The hollow cylinder may extend between opposite first and second ends. The hollow cylinder may have an outer cylinder surface and an inner cylinder surface that is opposite to the outer cylinder surface. The inner cylinder surface may at least partially define an internal enclosure having a central longitudinal axis that extends between the first and second ends of the hollow cylinder. The hollow cylinder may at least partially define a first opening into the internal enclosure at the first end of the hollow cylinder such that the central longitudinal axis intersects the first opening. The hollow cylinder may further at least partially define a second opening into the internal enclosure through a thickness of the hollow cylinder between the inner cylinder surface and the outer cylinder surface. The second opening may have a central axis that is different from the central longitudinal axis. The end plate may cover the second end of the hollow cylinder. The doser mechanism may include an auger conveyor including an auger at least partially extending through the internal enclosure between the first end and the second end and configured to rotate around a longitudinal axis of the auger. The doser mechanism may include a check valve coupled to the cylindrical shell and having a valve member configured to selectively cover the second opening. The check valve may be configured to cause the valve member to cover the second opening from an exterior of the doser mechanism in response to the valve member being in a rest position, and cause the valve member to move from the rest position to an open position to expose the second opening to the exterior of the doser mechanism in response to a force being applied to the valve member from the internal enclosure through the second opening.

The valve member may be a reed valve.

The valve member may be a movable gate configured to rotate around a pin that is attached to the cylindrical shell.

The check valve may include a spring that applies a spring force to spring-load the valve member to the rest position, such that the check valve is configured to cause the valve member to move from the rest position to an open in response to the force applied to the valve member from the internal enclosure through the second opening being greater than the spring force.

The check valve may include an actuator that is coupled to a drive motor and is configured to adjustably move the valve member between the rest position and the open position based on operation of the drive motor.

The check valve may be configured to cause the valve member to move to the rest position based on a weight of the valve member being greater than the force applied to the valve member from the internal enclosure through the second opening.

The valve member may include a cover plate having an inner cover surface configured to cover the second opening in response to the valve member being in the rest position.

The inner cover surface may have a surface contour that is complementary to a surface contour of a portion of the outer cylinder surface, such that the inner cover surface of the cover plate lies flush with the outer cylinder surface in response to the valve member being in the rest position.

The doser mechanism may further include a sheath structure overlapping the second opening and the check valve in a first vertical direction along a vertical axis that is perpendicular to the longitudinal axis. The sheath structure may further overlap the second opening and the check valve in opposite horizontal directions that are orthogonal to the vertical axis. The second opening may be configured to direct a material moving through the second opening to move at least partially in the first vertical direction. The sheath structure may be configured to cause the material moving through the second opening at least partially in the first vertical direction to be redirected to move in at least partially in a second vertical direction that is opposite to the first vertical direction.

The auger conveyor may include a twin-auger conveyor including two augers extending in parallel with each other through the internal enclosure, wherein the two augers are configured to rotate around respective longitudinal axes and in opposite rotational directions.

The two augers may be aligned along a horizontal axis that is perpendicular to the central longitudinal axis. The central axis of the second opening may be angled in relation to the horizontal axis by a first angle that is between about 45 degrees and about 90 degrees. The first angle may be between about 45 degrees and about 60 degrees. The first angle may be between about 60 degrees and about 85 degrees.

According to some example embodiments, a packaging machine may include the doser mechanism. The packaging machine may include a material reservoir. The auger conveyor of the doser mechanism may be configured to draw the material from the material reservoir. The packaging machine may include a packaging supply device configured to supply a strip of packaging material that is folded to define an open enclosure having an enclosure opening. The doser mechanism may be configured to supply the material into the open enclosure through the enclosure opening to at least partially fill a distal portion of the open enclosure with a particular amount of the material. The packaging machine may include a sealing device configured to join opposing surfaces of the folded strip of packaging material to isolate the distal portion of the open enclosure from a remainder of the open enclosure that includes the enclosure opening such that the isolated distal portion of the open enclosure establishes a sealed enclosure that contains the particular amount of the material in the folded strip of packaging material. The packaging machine may include a cutting device configured to separate the sealed enclosure from a remainder of the folded strip of packaging material to establish an article of packaging that contains the particular amount of the material.

The packaging machine may include a plurality of doser mechanisms, the plurality of doser mechanisms including the doser mechanism, the plurality of doser mechanisms configured to supply separate, respective amounts of the material in parallel. The packaging supply device may be configured to supply a plurality of strips of packaging material in parallel to the plurality of doser mechanisms, the plurality of strips of packaging material including the strip of packaging material.

According to some example embodiments, a method for supplying a particular amount of a material via the doser mechanism may include controlling the auger conveyor to operate to cause the material to move into the internal enclosure through the first opening, move through the internal enclosure from the first end toward the second end along the central longitudinal axis, and move out of internal enclosure through the second opening at the second end, such that the material moved through the second opening is caused to apply the force to the valve member of the check valve to cause the valve member to move from the rest position to the open position, such that the material exits the doser mechanism through the second opening. The method may include controlling the auger conveyor to stop operation, such that the valve member of the check valve moves to the rest position to restrict movement of the material out of the internal enclosure through the second opening.

The controlling the auger conveyor to stop operation may be in response to a determination that the auger conveyor has operated for a particular period of time.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
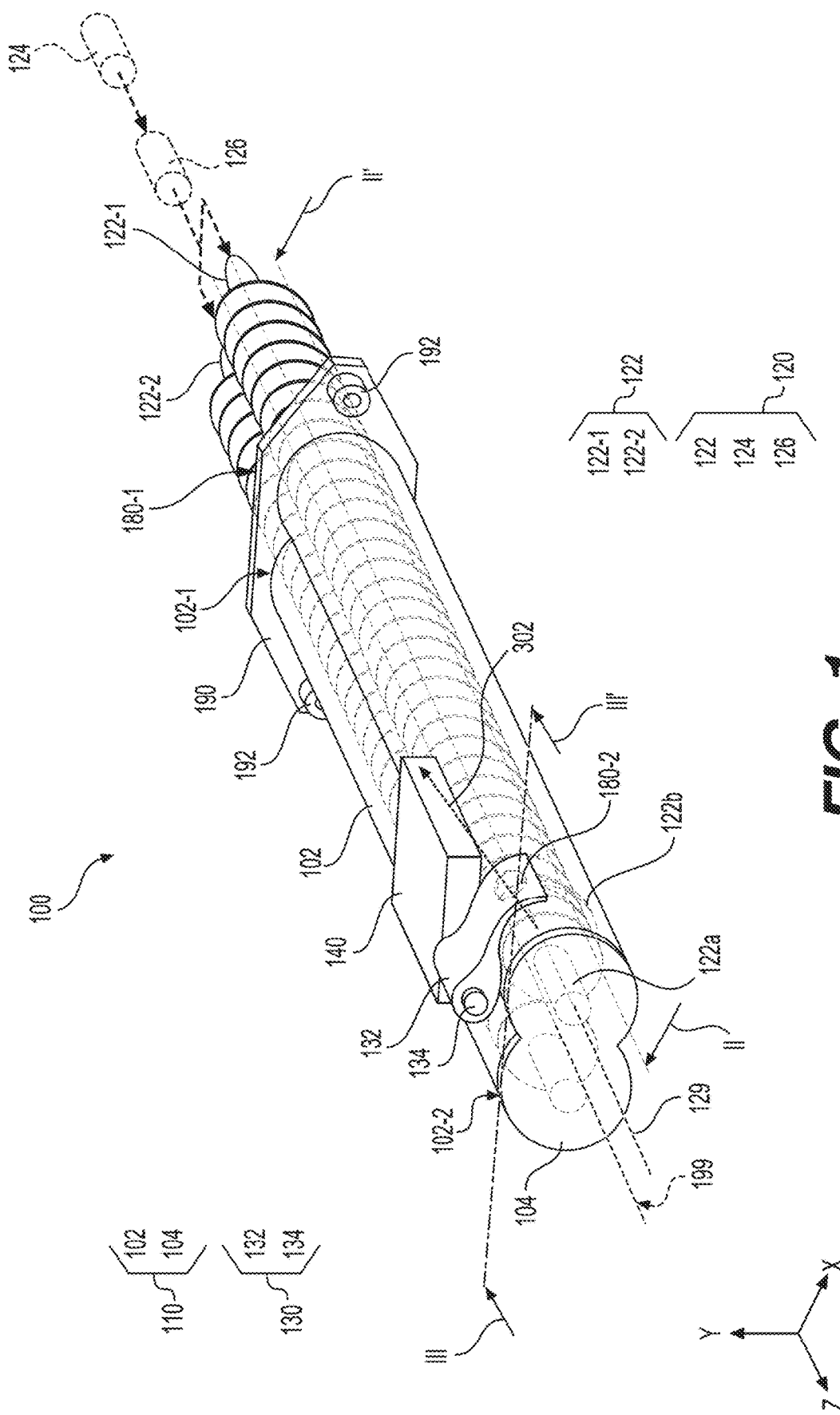
FIG. 1 is a perspective view of a doser mechanism, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular," "parallel," "flush," or the like with regard to other elements and/or properties thereof (e.g., structures, surfaces, directions, or the like) may be "perpendicular," "parallel," "flush," or the like or may be "substantially perpendicular," "substantially parallel," "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Figure 2:
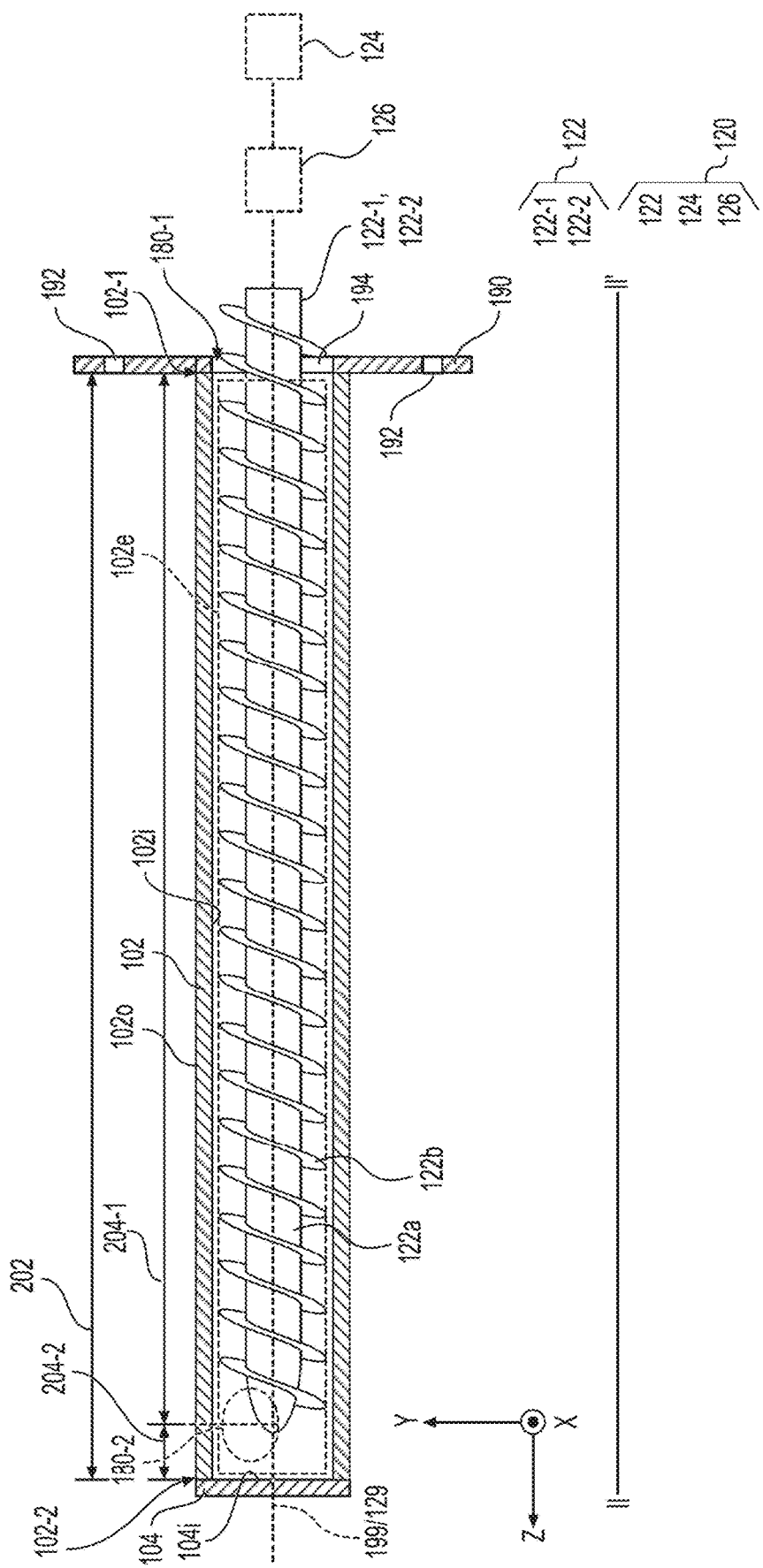
FIG. 2 is a cross-sectional view of the doser mechanism of FIG. 1 along cross-sectional view line II-IF, according to some example embodiments.
Figure 3A:
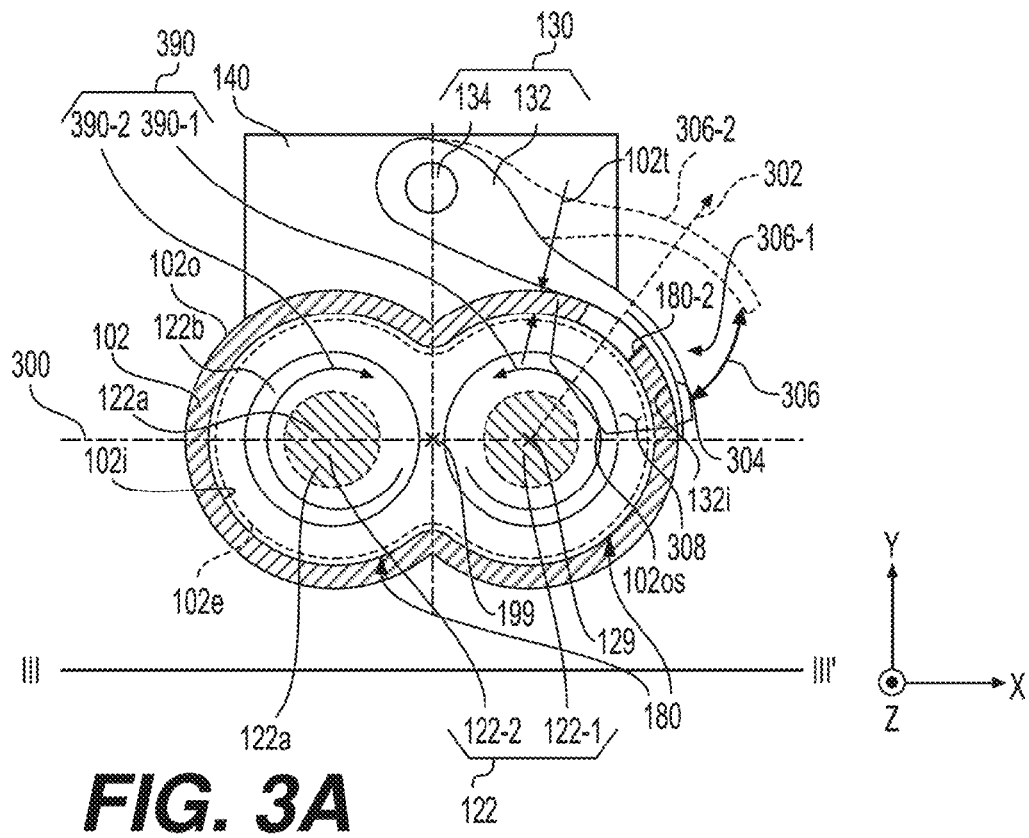
FIGS. 3A and 3B are cross-sectional views of the doser mechanism of FIG. 1 along cross-sectional view line III-III' with a valve member in a rest position and an open position, respectively, according to some example embodiments.
Figure 3B:
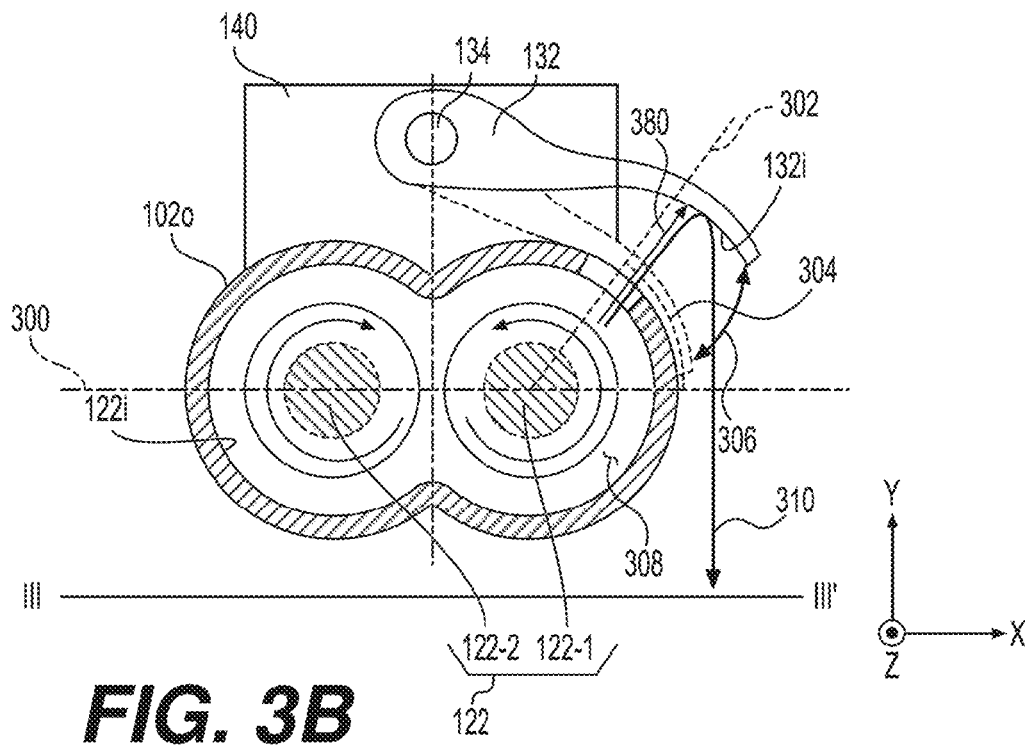

FIG. 1 is a perspective view of a doser mechanism, according to some example embodiments. FIG. 2 is a cross-sectional view of the doser mechanism of FIG. 1 along cross-sectional view line II-IF, according to some example embodiments. FIGS. 3A and 3B are cross-sectional views of the doser mechanism of FIG. 1 along cross-sectional view line III-III' with a valve member in a rest position and an open position, respectively, according to some example embodiments.

Referring first generally to FIGS. 1, 2, and 3A-3B, a doser mechanism 100 includes a cylindrical shell 110, an auger conveyor 120, and a check valve 130. The doser mechanism 100 is configured to controllably convey (e.g., supply, feed, move, force, discharge, flow, etc.) a granular material (also referred to herein as simply a "material") from a first opening 180-1 into an enclosure 102e of the cylindrical shell 110 (also referred to herein as an internal enclosure of the cylindrical shell 110, an internal open enclosure of the cylindrical shell 110, or the like). The doser mechanism 100 is further configured to convey (e.g., supply, feed, move, force, discharge, flow, etc.) the granular material through the enclosure 102e from the first opening 180-1 toward a second opening 180-2 that is proximate to an opposite end of the cylindrical shell 110 from the first opening 180-1. The doser mechanism 100 is further configured to convey (e.g., supply, feed, move, force, discharge, flow, etc.) the granular material through the second opening 180-2 and thus out of the doser mechanism 100. The movement, or conveyance, of the granular material through the doser mechanism 100 and through the second opening 180-2 may be controlled based at least on controlled (e.g., selectively activated and/or deactivated) operation of the auger conveyor 120, as described further below, to thus cause the doser mechanism 100 to supply a particular amount (e.g., volume and/or mass) of granular material, also referred to herein as an "index" or "dose" of granular material, which may be sealed in packages (e.g., articles of packaging) to provide a discrete, consistently-sized amount of granular material in each package.

Additionally, the check valve 130 of the doser mechanism 100 may selectively at least partially open (e.g., expose) the second opening 180-2 or at least partially cover (e.g., obstruct) or the second opening 180-2 based on whether the auger conveyor 120 is operating (e.g., whether one or more augers 122 of the auger conveyor 120 are rotating 390) to cause granular material 308 within the enclosure 102e proximate to the second opening 180-2 to move from the enclosure 102e and through the second opening 180-2 to exert a force 380 on a movable valve member 132 of the check valve 130 (e.g., an inner surface 132i thereof). Accordingly, the check valve 130 may at least partially cover the second opening 180-2 to apply a counter force on the granular material in the enclosure 102e and second opening 180-2 to create a backpressure that at least partially retains the granular material 308 within the enclosure 102e and/or second opening 180-2 and thus at least partially restricts drainage of granular material 308 from the enclosure 102e through the second opening 180-2 when the auger conveyor 120 is not operating (e.g., when the one or more augers 122 thereof are not rotating 390). As a result of the check valve 130 at least partially retaining granular material 308 in the doser mechanism 100 based on the auger conveyor 120 not operating (e.g., being in the "off" operating state), the supplying (e.g., discharge) of granular material 308 from the doser mechanism 100 may be more controllably linked to the operating state of the auger conveyor 120, enabling greater consistency, precision, and accuracy in the amount of granular material supplied by the doser mechanism 100 based on operation of the auger conveyor 120. Accordingly, the check valve 130 may enable the doser mechanism 100 to supply a particular amount (e.g., index, dose, etc.) of granular material with greater consistency, accuracy, and precision.

Still referring to FIGS. 1, 2, and 3A-3B, the cylindrical shell 110 includes at least a hollow cylinder 102 and an end cap 104 (also referred to herein as an end plate) that collectively define an open internal enclosure, referred to herein as enclosure 102e, defined by at least an inner cylinder surface 102i of the hollow cylinder 102 (and in some example embodiments further defined by an inner surface 104i of the end cap 104). As shown in FIGS. 1 and 2, the hollow cylinder 102 may extend between opposite first and second ends 102-1 and 102-2, and the hollow cylinder 102 may have an outer cylinder surface 102o and an inner cylinder surface 102i that is opposite to the outer cylinder surface 102o. The inner cylinder surface 102i at least partially defines an open internal enclosure, referred to as enclosure 102e, having a central longitudinal axis 199 that extends between the first and second ends 102-1 and 102-2 of the hollow cylinder 102.

As shown in at least FIGS. 1-2, the hollow cylinder 102 may at least partially define a first opening 180-1 into the enclosure 102e at the first end 102-1 of the hollow cylinder 102 such that the central longitudinal axis 199 intersects the first opening 180-1. As shown in at least FIG. 2, the central longitudinal axis 199 may extend through a center of the first opening 180-1 and may be the same as the central axis of the first opening 180-1.

Figure 4:
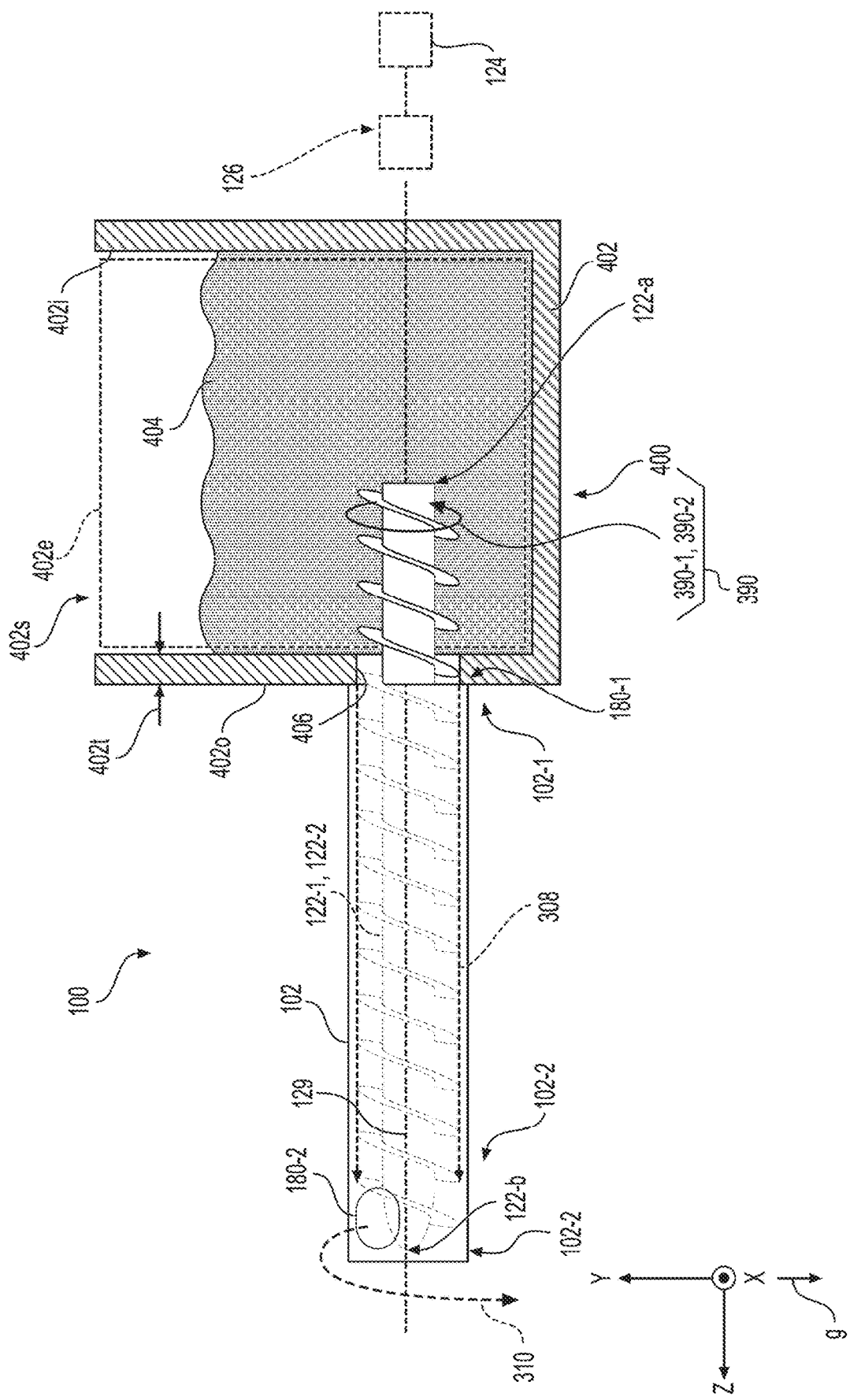
FIG. 4 is a cross-sectional view of a doser mechanism and a granular material reservoir, according to some example embodiments.

As shown in at least FIGS. 1-2, the first end 102-1 of the hollow cylinder 102 may be coupled (e.g., welded, bolted, adhered, etc.) to a bracket plate 190 which may itself be attached (e.g., via bolts extending through bolt holes 192 of the bracket plate 190) to a granular material reservoir (e.g., as shown in FIG. 4) so as to cause the first opening 180-1 to be in open, fluid communication (e.g., be exposed, directly or indirectly) to an interior of the reservoir to enable granular material to be drawn into the enclosure 102e from the reservoir via the first opening 180-1. In some example embodiments, the bracket plate 190 may itself include an opening 194 that is configured to overlap the first opening 180-1 when the hollow cylinder 102 is coupled to the bracket plate 190 such that granular material may be drawn into the enclosure 102e via the overlapped first opening 180-1 and opening 194. In some example embodiments, the bracket plate 190 may be omitted and the hollow cylinder 102 may be configured to be directly attached to a granular material reservoir so as to cause the first opening 180-1 to be in open, fluid communication (e.g., be exposed, directly or indirectly) to an interior of the reservoir.

As shown in FIGS. 1-2, the end cap 104 is attached (e.g., bolted, welded, adhered, etc.) to the second end 102-2 of the hollow cylinder 102 so as to cover (e.g., close, seal, etc.) the second end 102-2 to isolate the enclosure 102e from an exterior of the cylindrical shell 110 through the second end 102-2 of the hollow cylinder 102. As a result, movement of granular material 308 out of the enclosure 102e via an opening at the second end 102-2 that is intersected by the central longitudinal axis 199 is reduced or prevented. The enclosure 102e may be defined by at least the hollow cylinder 102 and the end cap 104 to be open at the first end 102-1 and closed at the second end 102-2 in a direction that is parallel to the central longitudinal axis 199 (e.g., the Z direction as shown in FIGS. 1-3B).

In some example embodiments, the hollow cylinder 102 and the end cap 104 may comprise one or more materials, including one or more metal materials (e.g., stainless steel, aluminum, etc.), one or more plastic materials (e.g., Nalgene®, polyether ether ketone (PEEK) plastic, liquid crystal polymer (LCP), Acetal, etc.), or the like. In some example embodiments, the hollow cylinder 102 and the end cap 104 may comprise any metal material. In some example embodiments, the hollow cylinder 102 and the end cap 104 comprise a same material (e.g., stainless steel, aluminum, plastic, etc.).

Still referring to FIGS. 1, 2, and 3A-3B, the hollow cylinder 102 may further define a second opening 180-2 into the enclosure 102e through a thickness 102t of the hollow cylinder 102 between the inner cylinder surface 102i and the outer cylinder surface 102o. Because the second opening 180-2 is defined by a conduit that extends through the thickness 102t of the hollow cylinder 102, the second opening 180-2 that is defined by the hollow cylinder 102 thus has a central axis 302 that is different from the central longitudinal axis 199. In particular, as shown, the central axis 302 of the second opening 180-2 may be perpendicular to a longitudinal axis that is parallel (e.g., paraxial) to the central longitudinal axis 199, and thus the central axis 302 may be perpendicular to the central longitudinal axis 199.

As a result, a granular material moving through the enclosure 102e between the first and second openings 180-1 and 180-2 may undergo a 90-degree turn from being moved along (e.g., paraxially and/or coaxially to) the central longitudinal axis 199 to moving along (e.g., paraxially and/or coaxially to) the central axis 302 in order to exit the enclosure 102e via the second opening 180-2.

Still referring to FIGS. 1, 2, 3A, and 3B, the auger conveyor 120 may include one or more augers 122 (which may include a shaft 122a and a helical screw blade 122b) that at least partially extend through the enclosure 102e between the first end 102-1 and the second end 102-2 in a direction that is parallel with the central longitudinal axis 199. As shown in FIGS. 1-3B, the one or more augers 122 may include multiple augers 122-1 and 122-2 that extend in parallel through the enclosure 102e, but example embodiments are not limited thereto and in some example embodiments only one auger 122 (e.g., only one of the augers 122-1 or 122-2) may be present in the enclosure 102e.

The one or more augers 122 may have one or more various diameters of shaft 122a and/or helical screw blade 122b may comprise any material, including stainless steel, plastic (e.g., e.g., Nalgene®, polyether ether ketone (PEEK) plastic, liquid crystal polymer (LCP), Acetal, etc.), or the like.

As shown in at least FIGS. 3A, the inner cylinder surface 102i of the hollow cylinder 102 may define multiple separate cylindrical portions (e.g., lobes 180) of the enclosure 102e that have respective central longitudinal axes that are coaxial or substantially coaxially with separate, respective augers 122. For example, as shown in FIGS. 3A-3B, where the auger conveyor 120 includes two separate augers 122-1 and 122-2 extending in parallel or substantially in parallel along respective longitudinal axes 129 through the enclosure 102e, the inner cylinder surface 102i of the hollow cylinder 102 may define a two-lobed enclosure 102e having two separate, at least partially cylindrical spaces ("lobes" 180) that are at least partially merged in the X and Y directions (e.g., as shown in FIGS. 3A-3B, at the center of the enclosure 102e in the X direction, at a boundary extending in the Y direction through the central longitudinal axis 199) and are each defined to have a curvature in the X and Y directions around a separate, respective longitudinal axis (e.g., a center of curvature of the respective lobe 180 that extends as an axis in the Z direction) that is coaxial or substantially coaxial with a separate, respective longitudinal axis 129 of the particular auger 122-1 or 122-2 that is extending in the Z direction through the respective "lobe" 180 of the enclosure 102e.

As shown in at least FIGS. 3A-3B, the one or more augers 122 may have a diameter that occupies a significant portion of the cross-sectional area (in the X and Y directions) of the respective lobe 180 of the enclosure 102e in which the one or more augers 122 is located. For example, referring to FIGS. 3A-3B, the outer diameter of a given auger 122 in the X-Y plane, which may be the outer diameter of the helical screw blade 122b of the given auger 122 as shown in FIGS. 3A-3B, may occupy between about 50% and about 90% of a diameter of the lobe 180 of the enclosure 102e that have a center of curvature extending in a Z-direction axis that is coaxial or substantially coaxial with the longitudinal axis 129 of the given auger 122.

As shown in at least FIG. 2, the one or more augers 122 may extend along the entire distance 202, or substantially the entire distance 202, between the first and second ends 102-1 and 102-2 through the enclosure 102e, but example embodiments are not limited thereto. For example, the one or more augers 122 may extend, from the first end 102-1, paraxially with (e.g., along) the central longitudinal axis 199, about 90% of the distance 202 between the first and second ends 102-1 and 102-2, about 95% of the distance 202 between the first and second ends 102-1 and 102-2, about 99% of the distance 202 between the first and second ends 102-1 and 102-2, or the like.

The one or more augers 122 may further extend, from the enclosure 102e, through the first opening 180-1 and to an exterior of the cylindrical shell 110. As shown, the auger conveyor 120 may include a drive motor 124 and a drive transmission 126. The one or more augers 122 may be mechanically coupled to the drive motor 124 (e.g., an electric motor, such as a servomotor), via the drive transmission 126 (e.g., a gear box, a drive belt, a set of meshed gears, or the like) such that the auger conveyor 120 is configured to cause the one or more augers 122 to rotate 390 (e.g., counter-rotate as shown in FIG. 3A) around their respective longitudinal axes 129 (which may extend in parallel to the central longitudinal axis 199) based on operation of the drive motor 124. The drive motor 124 may include a servomotor. In some example embodiments, the drive transmission 126 is absent from the auger conveyor 120 such that the drive motor 124 is mechanically coupled to at least one of the one or more augers 122 directly (e.g., as a direct drive mechanism). In some example embodiments, the drive transmission 126 is mechanically coupled between the one or more augers 122 and the drive motor 124 and is configured to transmit the rotation of a driveshaft of the drive motor 124 to the one or more augers 122 via the drive transmission 126. In some example embodiments, the drive transmission 126 is configured to transmit the drive motor 124 driveshaft rotation to each of the augers 122 (e.g., to both augers 122-1 and 122-2) to cause each of the augers 122 to rotate 390 (e.g., counter-rotate 390-1, 390-2 in synchronization with each other as shown in FIG. 3A) via the drive transmission 126.

As shown in at least FIGS. 1-2, the one or more augers 122 may extend out of the enclosure 102e via the first opening 180-1. The rotation 390 of the one or more augers 122 around their respective longitudinal axes 129 (e.g., rotation 390-1 of auger 122-1 in one rotational direction and counter-rotation 390-2 of auger 122-2 in an opposite rotational direction) may enable the one or more augers 122, and thus the auger conveyor 120, to convey (e.g., move) granular material from a location external to the cylindrical shell 110 (e.g., a granular material reservoir as described herein) to the enclosure 102e via the first opening 180-1 and to further move the granular material through the enclosure 102e from the first opening 180-1 towards the second end 102-2 of the hollow cylinder 102 (which is covered by the end cap 104). As a result, the auger conveyor 120 may be configured to operate (e.g., based on being in the "on" operating state such that the one or more augers 122 are rotating 390 (e.g., counter-rotating) around their respective longitudinal axes 129) to move the granular material from the first opening 180-1 and towards the second opening 180-2 through the enclosure 102e.

Figure 7:
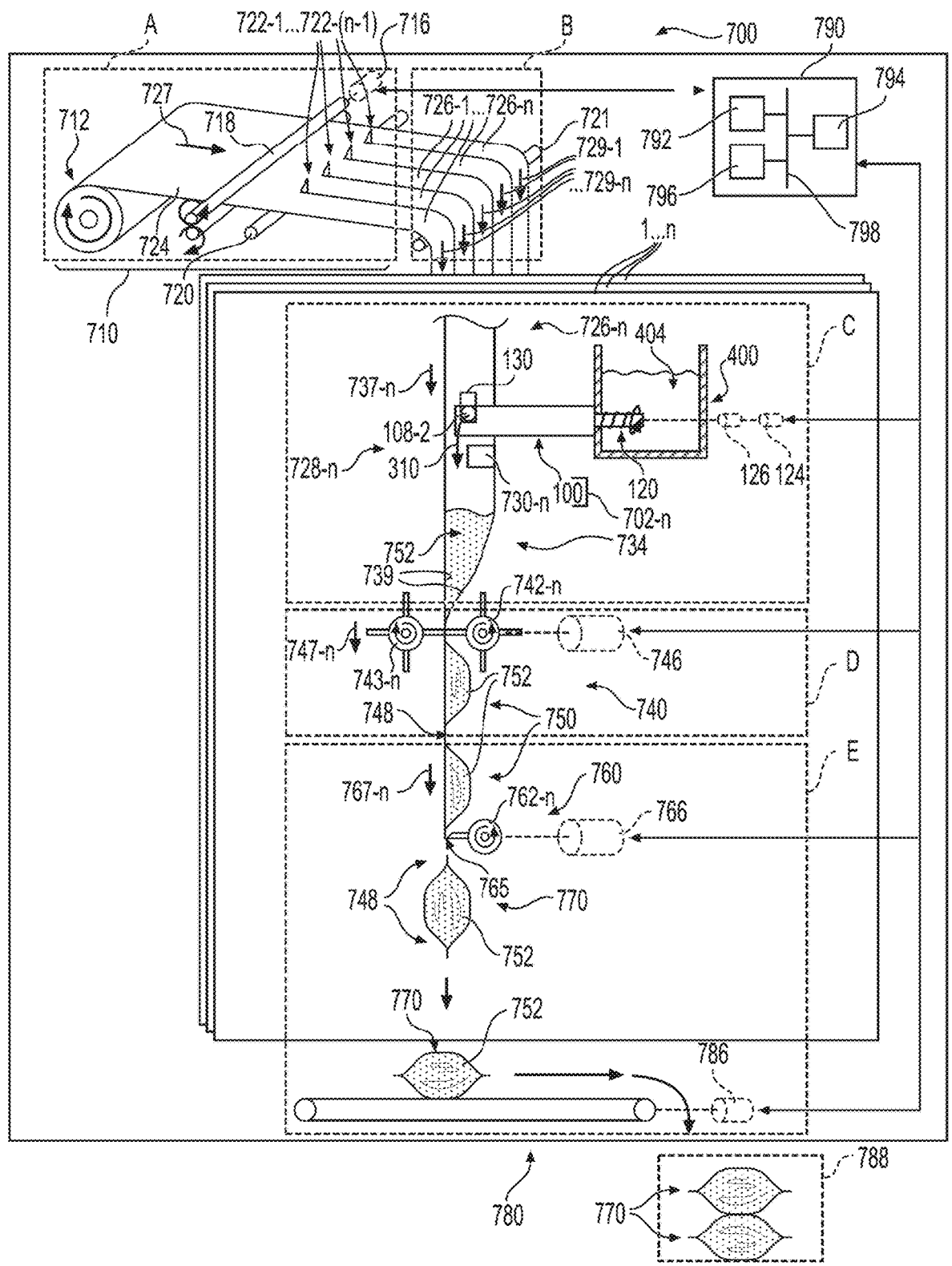
FIG. 7 is a schematic view of a packaging machine that includes a doser mechanism, according to some example embodiments.

It will be understood that the drive motor 124 may be communicatively coupled (e.g., via a wired or wireless electronic communication link) to a control device as described herein (e.g., control device 790 shown in FIG. 7). The control device may be configured to control the drive motor 124 (e.g., control activation/deactivation timing of drive motor 124 driveshaft rotation, rotation duration, rotation count, and/or rate of rotation) to control operation of the auger conveyor 120, for example to selectively activate and deactivate rotation 390 of the one or more augers 122 at particular times and to further control the rate of rotation 390 of the one or more augers 122, to control the timing and/or rate of movement, supply, etc. of granular material by the doser mechanism 100. In some example embodiments, the control device that is configured to control the drive motor 124 may be considered to be a part of the doser mechanism 100. In some example embodiments, the control device may be considered to be separate from the doser mechanism 100.

In some example embodiments, the drive motor 124 may be a servomotor (which will be understood to have a driveshaft that may be controllably caused to rotate) that may be controlled by a control device as described herein (e.g., control device 790 as shown in FIG. 7) to switch the auger conveyor 120 to the "on" operating state at a particular time to cause the one or more augers 122 to each rotate 390 at a particular rate of rotation (which may be the same rate or different rate for each of the one or more augers 122) for a particular period of time (e.g., a particular duration) and then to stop rotating 390 (e.g., switch the auger conveyor 120 to the "off" operating state) so that the one or more augers 122 move (e.g., discharge) a particular amount of granular material out of the second opening 180-2 during the particular period of time following the particular time at which the auger conveyor 120 is first switched to the "on" operating state and ending at the next time at which the auger conveyor 120 switched to the "off" operating state. Such a particular amount of granular material may be considered to be an "index" or "dose" of granular material that is supplied by the doser mechanism 100. The operation of the drive motor 124 to cause the doser mechanism 100 to supply the particular amount of granular material (e.g., the "index" or "dose" of granular material) out of the second opening 180-2 due to causing the one or more augers 122 to rotate 390 for a particular period of time at respective particular rates of rotation (e.g., based on causing the drive motor 124 to rotate the driveshaft thereof at a particular rate of rotation for a particular period of time) may be referred to as causing the doser mechanism 100 to execute an "index" operation.

In some example embodiments, the drive motor 124 may be a servomotor that may be controlled by a control device as described herein (e.g., control device 790 as shown in FIG. 7) to rotate a driveshaft thereof for a particular number of times at a particular rate of rotation, to rotate the driveshaft thereof for a particular period of time at a particular rate of rotation, or the like. Such controlled rotation of the drive motor 124 driveshaft may correspond to causing the one or more augers 122 to each rotate 390 for a particular number of times at a particular rate of rotation, to each rotate 390 for a particular period of time at a particular rate of rotation, or the like.

Such controlled rotation of the drive motor 124 driveshaft may therefore correspond to causing the auger conveyor 120, and thus the doser mechanism 100, to supply a particular amount of granular material. A relationship between driveshaft rotation duration, rotation rate, rotation count, amount and/or rate of electrical power supplied to drive motor, and the resulting amount of granular material supplied by the doser mechanism 100 may be stored in a database (e.g., an empirically-generated look-up table). The control device may be configured to access the database (e.g., where the database is stored in a memory of the control device) to enable the control device to drive the drive motor 124 in such a way as to control the doser mechanism 100 to supply a particular amount of granular material at a particular time, at a particular period in time, or the like. As a result, the amount of granular material that is moved by the auger 122 through the enclosure 102e and through the second opening 180-2 may be more precisely controlled based on controlling the operation of the drive motor 124.

Referring to FIGS. 1 and 2, the second opening 180-2 may be located at a position in the hollow cylinder 102 that is proximate (e.g., adjacent) to the second end 102-2 of the hollow cylinder 102, so that granular material conveyed through the enclosure 102e from the first opening 180-1 to the second opening 180-2 may move through an entirety, substantially an entirety, or a majority of the length of the enclosure 102e along the central longitudinal axis 199 between the first and second ends 102-1 and 102-2 of the hollow cylinder 102 (where the length may be the same as the distance 202 between the first and second ends 102-1 and 102-2). For example, the second opening 180-2 may be spaced apart from the first end 102-1 by a distance along the central longitudinal axis 199 that is, for example, about 55% of the distance 202 between the first and second ends 102-1 and 102-2, about 60% of the distance 202 between the first and second ends 102-1 and 102-2, about 65% of the distance 202 between the first and second ends 102-1 and 102-2, about 70% of the distance 202 between the first and second ends 102-1 and 102-2, about 75% of the distance 202 between the first and second ends 102-1 and 102-2, about 80% of the distance 202 between the first and second ends 102-1 and 102-2, about 85% of the distance 202 between the first and second ends 102-1 and 102-2, about 90% of the distance 202 between the first and second ends 102-1 and 102-2, about 95% of the distance 202 between the first and second ends 102-1 and 102-2, about 99% of the distance 202 between the first and second ends 102-1 and 102-2, or the like.

As shown in FIG. 2, the second opening 180-2 may be located at a position in the hollow cylinder 102 that is a first distance 204-1 from the first end 102-1 along the central longitudinal axis 199 and a second distance 204-2 from the second end 102-1 along the central longitudinal axis 199. In some example embodiments, the magnitude of the first distance 204-1 may be equal to or less than the magnitude of the distance 202, for example about 99% of the magnitude of the distance 202, about 95% of the magnitude of the distance 202, about 90% of the magnitude of the distance 202, about 85% of the magnitude of the distance 202, about 80% of the magnitude of the distance 202, about 75% of the magnitude of the distance 202, about 70% of the magnitude of the distance 202, about 65% of the magnitude of the distance 202, about 60% of the magnitude of the distance 202, about 60% of the magnitude of the distance 202, about 55% of the magnitude of the distance 202, or the like. In some example embodiments, the magnitude of the first distance 204-1 may be greater than the magnitude of the second distance 204-2, such that the second opening 180-2 is closer to the second end 102-2 than to the first end 102-1 along the central longitudinal axis 199. In some example embodiments, a ratio of the magnitude of the first distance 204-1 to the magnitude of the second distance 204-2 may be about 1.5:1, 2:1, 3:1, 4:1, 5:1, 6:1, 7:1, 8:1, 9:1, or the like.

In some example embodiments, distance 202 is about 5 inches, first distance 204-1 is about 4.39 inches, the second opening 180-2 has a diameter of about 0.5 inches, and the first opening 180-1 (and the enclosure 102e) has a diameter of about 802/1000 inches. In some example embodiments, the first opening 180-1 (and the enclosure 102e) has a diameter of about inches. In some example embodiments, each auger 122-1, 122-2 has a diameter (e.g., in an X-Y plane), between opposite edges of the helical screw blade 122b of the respective auger 122-1, 122-2, that is about 0.5 inches.

Still referring to FIGS. 1, 2, 3A, and 3B, the check valve 130 is coupled (e.g., attached, via welding, bolt connection, adhesion, or the like) to the cylindrical shell 110 and includes at least a valve member 132 that is configured to move in relation to the cylindrical shell 110 (e.g., is moveable in relation to the cylindrical shell 110) to selectively cover or expose the second opening 180-2 with respect to an exterior of the doser mechanism 100 based on the valve member 132 being in a rest position 306-1 (e.g., closed position) or an open position 306-2 (e.g., flexed position), respectively. FIGS. 1, 2, 3A, and 3B illustrate the check valve 130 as including a valve member 132 that is a movable gate configured to rotate around an attachment structure 134 that is a pin or hinge attached to the cylindrical shell 110. But, as described further below with reference to at least FIGS. 5A-5E, example embodiments of the check valve 130 are not limited thereto, and descriptions herein with regard to a check valve 130 of FIGS. 1, 2, 3A, and 3B may apply to some or all of the example embodiments of the check valve 130.

Referring now specifically to FIGS. 1, 3A, and 3B, the valve member 132 of the check valve 130 is configured to move 306 between a rest position 306-1 as shown in FIG. 3A (also referred to herein as a return position, a closed position, and/or a relaxed position of the valve member), and an open position 306-2 as shown in FIG. 3B (also referred to as a flexed position) to selectively cover or expose the second opening 180-2 with respect to an exterior of the doser mechanism 100. In some example embodiments, when the valve member 132 is in the rest position 306-1 and covers the second opening 180-2, the valve member 132 may at least partially obscure (e.g., isolate) the second opening 180-2 from the exterior of the doser mechanism 100. In some example embodiments, when the valve member 132 is in the rest position 306-1 and covers the second opening 180-2, an inner surface 132i of the valve member 132 may contact at least a portion 102os of the outer cylinder surface 102o of the hollow cylinder 102 that is proximate (e.g., adjacent) to and/or surrounds the second opening 180-2. In some example embodiments, when the valve member 132 is in the rest position 306-1 and covers the second opening 180-2, the inner surface 132i of the valve member 132 may lie in flush contact with at least the portion 102os of the outer cylinder surface 102o of the hollow cylinder 102 that is proximate (e.g., adjacent) to and/or surrounds the second opening 180-2.

In some example embodiments, for example the example embodiments where the valve member 132 is a moveable gate as shown in FIGS. 3A-3B, the check valve 130 is coupled (e.g., attached) to the cylindrical shell 110 so that the valve member 132 is configured to rest on at least a portion of the outer cylinder surface 102o of the hollow cylinder 102 when the valve member 132 is at the rest position 306-1, for example such that an inner surface 132i of the valve member 132 rests in contact with the portion of the outer cylinder surface 102o of the hollow cylinder 102. When the valve member 132 rests on a portion of the outer cylinder surface 102o, a weight, or structural load, of the valve member 132 may be transferred to the hollow cylinder 102 via the portion of the valve member 132 contacting the portion of the outer cylinder surface 102o.

As shown in FIG. 3A, the valve member 132 may be configured to move 306 to the rest position 306-1 in the absence of external forces aside from the force of gravity (e.g., the weight of the valve member 132 itself) acting on the valve member 132, and to move 306 from the rest position 306-1 towards the open position 306-2 based an external force 380 acting on the valve member 132 from the enclosure 102e through the second opening 180-2. Such a valve member 132 may be referred to as a "trap-door" gate and a check valve 130 including such a valve member 132 may be referred to as a "trap-door valve" or "trap-door mechanism." Said external force 380 may be applied by a flow of granular material 308 that flows through the second opening 180-2 from the enclosure 102e, based on the auger conveyor 120 operating (e.g., the augers 122-1 and 122-2 counter-rotating 390-1 and 390-2 around their respective longitudinal axes 129) to cause the granular material 308 to move from the enclosure 102e and through the second opening 180-2 as supplied granular material 310 to contact the valve member 132 (e.g., contact the inner surface 132i). For example, the flow of granular material 308 out of the enclosure 102e via the second opening 180-2 as supplied granular material 310 may be driven by the auger conveyor 120 (e.g., based on the one or more augers 122 rotating 390 around their respective longitudinal axes 129) to exert the force 380 on the valve member 132 of the check valve 130 to cause the valve member 132 to move 306 to the open position 306-2 so that the granular material 308 may be conveyed by the auger conveyor 120 to exit the doser mechanism 100 as supplied granular material 310 and thus to be "supplied" by the doser mechanism 100. It will be understood that supplied granular material 310 may refer to granular material 308 that exits the doser mechanism 100 via the second opening 180-2.

The auger conveyor 120 may be in an operational state or a stopped state (also referred to herein as an "on" operating state and an "off" operating state, respectively, where "operating state" may be referred to interchangeably as "operation mode"). In the "on" operating state, the auger conveyor 120 is at least partially moving (e.g., the one or more augers 122 may be rotating 390 around their respective longitudinal axes 129) such that the auger conveyor 120 may operate to apply force to granular material 308 to cause the granular material 308 to move at least to the second opening 180-2 through the enclosure 102e. The rotating one or more augers 122 may cause an increase of a pressure of the granular material 308 in at least a portion of the enclosure 102e that is proximate (e.g., adjacent) to the second opening 180-2 and thus cause the granular material 308 to apply (e.g., exert) force 380 (e.g., pressure) on the valve member 132 of the check valve 130 through the second opening 180-2 based on the auger conveyor 120 being in the operating configuration. In the "off" operating state, the auger conveyor 120 is at least partially not moving (e.g., the one or more augers 122 may not be rotating 390 around their respective longitudinal axes 129) and thus is not operating to apply force to granular material 308 to move the granular material 308 through the enclosure 102e, and thus the granular material 308 may not apply force 380 to the valve member 132, or may cease applying said force 380, in response to the auger conveyor 120 being in the "off" operating state.

As shown in FIGS. 3A and 3B, the check valve 130 may be configured to cause the valve member 132 to cover the second opening 180-2 from the exterior of the hollow cylinder 102 in response to the valve member 132 being in the rest position 306-1, as shown in FIG. 3A. The check valve 130 may be configured to cause the valve member 132 to move 306 from the rest position 306-1 to an open position 306-2 (e.g., to cause the check valve 130 to open) to at least partially expose the second opening 180-2 to the exterior of the doser mechanism 100 in response to the auger conveyor 120 operating (e.g., being in the "on" operating state, switching from the "off" operating state to the "on" operating state, etc.) to move granular material 308 through the second opening 180-2 via the enclosure 102e such that the granular material 308 applies force 380 on the valve member 132 through the second opening 180-2, thereby "pushing" the valve member 132 (e.g., overcoming the force of the weight of at least a portion of the valve member 132) to the open position 306-2 to expose the second opening 180-2, as shown in FIG. 3B.

The check valve 130 may be configured to cause the valve member 132 to move 306 from the open position 306-2 to the rest position 306-1 (e.g., to cause the check valve 130 to close) to at least partially cover the second opening 180-2 from the exterior of the doser mechanism 100 in response to the force 380 ceasing to be applied or being reduced in magnitude applied to the valve member 132 from the enclosure 102e through the second opening 180-2, for example in response to the auger conveyor 120 ceasing operation (e.g., being in the "off" operating state, switching from the "on" operating state to the "off" operating state, etc.), thereby causing the valve member 132 to return (e.g., relax) to the rest position 306-1 to at least partially cover the second opening 180-2, as shown in FIG. 3A.

Covering (e.g., obstructing, closing, etc.) the second opening 180-2 may include establishing a partial or complete sealing of the second opening 180-2, such that the flow of granular material 308 out of the enclosure 102e via the second opening 180-2 may be partially or completely restricted as a result of the valve member 132 being in the rest position 306-1.

Still referring to FIGS. 3A and 3B, when the valve member 132 is in the rest position 306-1, the valve member 132 may cover the second opening 180-2 such that the valve member 132 at least partially obstructs the cross-sectional flow area of fluid communication between the enclosure 102e and the exterior through the second opening 180-2, so that a potential flow of granular material 308 from the enclosure 102e to the exterior of the doser mechanism 100 via the second opening 180-2 is partially or completely inhibited by the valve member 132 that is in the rest position 306-1. The covering of the second opening 180-2 by the valve member 132 in the rest position 306-1 may be only partial, such that a complete sealing of the second opening 180-2 by the valve member 132 is not achieved but instead a partial sealing that is sufficient to restrict or prevent granular material 308 flow out of the enclosure 102e via the second opening 180-2 is achieved.

As shown in at least FIG. 3B, when the auger conveyor 120 is in an "on" operating state, such that the drive motor 124 causes the one or more augers 122 to rotate 390 around their respective longitudinal axes 129 to cause granular material 308 to move through the enclosure 102e from the first opening 180-1 toward the second opening 180-2, the auger conveyor 120 may cause granular material 308 to be moved from the enclosure 102e and through the second opening 180-2 to apply force 380 on the valve member 132 to cause the valve member 132 to move 306 from the rest position 306-1 as shown in FIG. 3A to the open position 306-2 as shown in FIG. 3B. Such movement of the valve member 132 from the rest position 306-1 to the open position 306-2 may open or expand the cross-sectional flow area of fluid communication between the enclosure 102e and the exterior of the doser mechanism 100 through the second opening 180-2 and thus may enable the granular material 308 to exit the enclosure 102e and to be supplied out of the doser mechanism 100 through the second opening 180-2 as supplied granular material 310.

As further shown in FIGS. 3A-3B, when the auger conveyor 120 is in an "off" operating state, such that the drive motor 124 is not transmitting power to the one or more augers 122 and thus is not causing the one or more augers 122 to rotate 390 around their respective longitudinal axes 129, the movement of granular material 308 through the enclosure 102e by the auger conveyor 120 may be inhibited or reduced, and the force 380 applied by the granular material 308 on the valve member 132 may cease or be reduced in magnitude, so that the valve member 132 may move 306 from the open position 306-2 shown in FIG. 3B to the rest position 306-1 shown in FIG. 3A in response to the ceasing or reduction of the applied force 380. In some example embodiments, the check valve 130 is configured to exert a biasing force that causes the valve member 132 to move to the rest position 306-1 (e.g., bias the valve member 132 to the rest position 306-1). The biasing force may include one or more of the weight of at least a portion of the valve member 132 and/or a force exerted on the valve member 132 by an element of the check valve (e.g., a spring force exerted by a spring of the check valve 130, described below with reference to FIG. 5E). In the absence of a sufficient-magnitude countering force 380 that at least partially overcomes the biasing force acting on the valve member 132 to cause the valve member 132 to at least partially move away from the rest position 306-1, the valve member 132 may return to and/or remain at the rest position 306-1.

Referring to FIGS. 3A-3B, when one or more augers 122 are rotating around their respective longitudinal axes 129, an internal pressure of the granular material 308 proximate (e.g., adjacent) to the second opening 180-2 may be increased to create a pressure gradient between the enclosure 102e and an exterior of the doser mechanism 100 across the second opening 180-2, such that the granular material 308 is caused by the rotating one or more augers 122 to move out of the enclosure 102e through the second opening 180-2 as supplied granular material 310 due to the pressure gradient.

Referring to FIGS. 3A-3B, when the valve member 132 is in the rest position 306-1, the biasing force on the valve member 132 (e.g., the weight of the valve member, a spring force applied on the valve member 132 by a spring of the check valve 130, etc.) may cause the valve member 132 to exert a force (e.g., counter force) on, and opposing and/or resisting, a flow of granular material 308 through the second opening 180-2 from the enclosure 102e. Thus, the valve member 132 in the rest position 306-1 may create a "back pressure" on the flow of granular material 308 through the second opening 180-2 that is sufficient to overcome a pressure gradient in the granular material from the enclosure 102e to the exterior of the doser mechanism 100 across the second opening 180-2. As a result, the valve member 132 in the rest position 306-1 may restrict or inhibit the flow of granular material 308 through the second opening 180-2 such that the valve member 132 causes the granular material 308 to be retained in the enclosure 102e.

The check valve 130 may be understood to be configured to cause the valve member 132 to move between the rest position 306-1 and the open position 306-2, to cover or expose the second opening 180-2 in response to a magnitude of a force 380 applied to the valve member 132 from the enclosure 102e through the second opening 180-2, for example in response to the magnitude of the force 380 overcoming or failing to overcome a biasing force on the valve member 132, where such biasing force may include at least a portion of the weight of the valve member 132 and/or a spring force of the check valve 130, that acts on the valve member 132 to "bias" the valve member 132 to move to the rest position 306-1 in the absence of a sufficient-magnitude countering force 380.

It will be understood that the check valve 130 may be configured to selectively cover (e.g., at least partially seal) or expose the second opening 180-2, thereby selectively restricting or enabling flow of the granular material 308 out of the enclosure 102e through the second opening 180-2, based on whether the auger conveyor 120 is operating (e.g., in the "on" operating state) to cause the granular material 308 to move through the enclosure 102e from the first opening 180-1 toward the second opening 180-2 to thereby apply a force 380 on at least a portion of the valve member 132 to cause the valve member 132 to move 306 from the rest position 306-1 to the open position 306-2. Additionally, the check valve 130 may be configured to selectively cover the second opening 180-2 in response to the auger conveyor 120 being in the "off" operating state (e.g., the one or more augers 122 are not rotating, are not causing granular material 308 to move, etc.).

In some example embodiments, a doser mechanism 100 that includes the check valve 130 may be configured to reduce or prevent the drainage of granular material 308 from the enclosure 102e (and thus from the doser mechanism 100) via the second opening 180-2 and thus retain the granular material 308 within the doser mechanism 100 when the auger conveyor 120 is in the "off" operating state. As a result, when the doser mechanism 100 is controlled to execute an "index" operation to operate (e.g., cause the one or more augers 122 to rotate 390) at a particular rate (e.g., particular rotational rate of the drive motor 124 driveshaft and/or the one or more augers 122) for a particular period of time to supply a particular amount (e.g., "index," "dose," etc.) of granular material (e.g., a particular amount of supplied granular material 310), the precision, accuracy, and consistency of the amount of granular material supplied in each index operation may be improved. For example, the valve member 132 may move to the rest position 306-1 in response to the auger conveyor 120 switching to the "off" operating state at the end of the index operation (e.g., based on the one or more augers 122 stopping rotation 390 such that the magnitude of force 380 decreases), and the movement 306 of the valve member 132 to the rest position 306-1 may cause a quick restriction or inhibiting of the flow of granular material 308 out of the doser mechanism 100 through second opening 180-2, thereby reducing or inhibiting a gradual "tapering-off" of the flow of granular material 308 out of the doser mechanism 100 in response to ceased rotation 390 of the one or more augers 122 at the end of the index operation. Such reduction or inhibition of taper-off of granular material 308 flow through the second opening 180-2 may improve control over the accuracy, precision, and consistency of the amount of granular material supplied in an index operation (e.g., as a result of the doser mechanism 100 performing the index operation and/or being controlled to perform the index operation).

In some example embodiments, the improved precision in the supply of granular material (e.g., supplied granular material 310) by the doser mechanism 100, as enabled by the check valve 130, may further reduce the probability that granular material may drain onto and/or into one or more mechanisms and/or devices (e.g., one or more portions, mechanisms, and/or devices of a packaging machine that includes the doser mechanism), a factory workspace, or the like when the auger conveyor 120 is in an "off" operating state. As a result, the doser mechanism 100 may enable reduced maintenance requirements associated with the doser mechanism 100 and/or a packaging machine including same.

Still referring to FIGS. 1, 2, 3A, and 3B, in some example embodiments the auger conveyor 120 may include a twin-auger arrangement of augers 122-1 and 122-2 that may extend paraxially with the central longitudinal axis 199 through the enclosure 102e, where both of the augers 122-1 and 122-2 may rotate 390 (e.g., counter-rotate 390-1, 390-2 in opposite rotational directions) at respective rates of rotation (which may be the same or different magnitude of rates of rotation), based on one or both of the augers 122-1 and/or 122-2 being driven by the drive motor 124 (e.g., via drive transmission), to cause granular material 308 to move through the enclosure 102e from the first opening 180-1 toward the second opening 180-2. In some example embodiments, the augers 122-1 and 122-2 are independently mechanically coupled to a drive transmission 126 (e.g., a gear box, drive belt assembly, meshed gear set, etc.) and thus are mechanically coupled to the drive motor 124 via the drive transmission 126. Accordingly, the augers 122-1 and 122-2 may be driven by the drive motor 124 via the drive transmission 126. The drive transmission 126 (e.g., a gear box) may cause the rotations (e.g., counter-rotations 390-1, 390-2) of the driven augers 122-1 and 122-2 to be synchronized (e.g., a same respective magnitude of rate of rotation, in the same direction of rotation or in opposite directions of rotation) in relation to each other.

In some example embodiments, both augers 122-1 and 122-2 are independently mechanically connected to a gear box drive transmission 126 that is further mechanically connected to the drive motor 124 that is a servomotor, such that the gear box drive transmission 126 is mechanically coupled between each of the augers 122-1 and 122-2 and the servomotor drive motor 124. The operating servomotor drive motor 124 may drive the gear box drive transmission 126 to drive each of the augers 122-1 and 122-1 to cause the augers 122-1 and 122-2 to rotate 390-1, 390-2 simultaneously and/or in synchronization with each other in a same or opposite rotational directions.

As shown, the two augers 122-1 and 122-2 may be aligned (e.g., may overlap) with each other in a horizontal direction that is orthogonal to the direction of the central longitudinal axis 199 (e.g., the horizontal direction may be the X direction as shown in FIGS. 1-3B). The two augers 122-1 and 122-2 may thus be aligned (e.g., may overlap) with each other (e.g., the respective longitudinal axes of the augers 122-1 and 122-2 may be aligned to overlap) in a horizontal plane (e.g., horizontal plane 300 as shown in FIGS. 1-3B, which may be understood to be a plane extending in the X-Z directions). The central longitudinal axis 199 may also extend in the horizontal plane 300. The central longitudinal axis 199 may extend in parallel with the horizontal plane 300.

As further shown in FIGS. 3A-3B, the second opening 180-2 may be located in (e.g., may extend through a thickness 102*t* of) a portion of the hollow cylinder 102 at "an upper side" of the hollow cylinder 102. The "upper side" of the hollow cylinder 102 may, in some example embodiments, be referred to as a portion of the hollow cylinder 102 that "above" (e.g., in the +Y direction from) a horizontal plane 300 in the X-Z directions in which the central longitudinal axis 199 extends, so that the second opening 180-2 may be understood to be in an "upper" position in the hollow cylinder 102.

As further shown in FIGS. 3A-3B, based on the second opening 180-2 being located in a portion of the hollow cylinder 102 at "an upper side" of the hollow cylinder 102, the central axis 302 of the second opening 180-2 may intersect the horizontal, X-Z plane (e.g., intersect a longitudinal axis 129 of a proximate and/or adjacent auger 122-1) such that the central axis 302 may define an angle 304 with the horizontal direction (e.g., X direction), the longitudinal axis 129 of the proximate and/or adjacent auger 122-1, and/or with the horizontal plane 300 (e.g., the X-Z plane).

In some example embodiments, the second opening 180-2 may be located at the upper side of the hollow cylinder 102, for example such that the central axis 302 of the second opening extends at least partially in a first vertical direction (e.g., the +Y direction) that is opposite to the direction of the force of gravity (e.g., the —Y direction) when the doser mechanism 100 is in operation (e.g., is attached to a granular material reservoir as described herein, is incorporated within a packaging machine as described herein, etc.), such that the check valve 130 may be configured to enable the valve member 132 to be biased by at least the force of gravity (e.g., gravity alone or gravity and an additional biasing force such as a spring force applied by a spring of the check valve 130) to the rest position 306-1 to at least partially cover the second opening 180-2 and/or rest on (e.g., directly on) a portion 102*os* of the outer cylinder surface 102*o* that is adjacent to and/or surrounds the second opening due to at least gravity. The "upper side" of the hollow cylinder 102 may, in some example embodiments, be referred to as a portion of the hollow cylinder 102 that is above (e.g., in the +Y direction from) a horizontal plane 300 in the X-Z directions that intersects the central longitudinal axis 199. As a result, the second opening 180-2 may be configured to direct granular material 308 that is moved through the second opening 180-2 to move at least partially upwards (e.g., in the +Y direction) against the force of gravity (e.g., in the —Y direction). The second opening 180-2 may be at least partially configured to mitigate granular material 308 drainage through the second opening 180-2 when the auger conveyor 120 is in the "off" operating state, based on the second opening 180-2 being located at the upper side of the hollow cylinder 102.

The angle 304 may be between about 45 degrees and about 90 degrees, between about degrees and about 85 degrees, between about 45 degrees and about 80 degrees, between about degrees and about 75 degrees, between about 45 degrees and about 70 degrees, between about degrees and about 65 degrees, between about 45 degrees and about 60 degrees, between about degrees and about 55 degrees, between about 45 degrees and about 50 degrees, or any combination thereof.

The angle 304 may be between about 90 degrees and about 85 degrees, between about degrees and about 80 degrees, between about 90 degrees and about 75 degrees, between about degrees and about 70 degrees, between about 90 degrees and about 65 degrees, between about degrees and about 60 degrees, between about 90 degrees and about 55 degrees, between about degrees and about 50 degrees, between about 90 degrees and about 45 degrees, or any combination thereof.

The angle 304 may be between about 90 degrees and about 0 degrees, between about degrees and about 0 degrees, between about 40 degrees and about 0 degrees, between about degrees and about 0 degrees, between about 30 degrees and about 0 degrees, between about degrees and about 0 degrees, between about 20 degrees and about 0 degrees, between about degrees and about 0 degrees, between about 10 degrees and about 0 degrees, between about 5 degrees and about 0 degrees, or any combination thereof.

Still referring to FIGS. 1-3B, in some example embodiments the doser mechanism 100 includes a piece of material, for example a plate 140, that is fixed to the cylindrical shell 110. The check valve 130 may be coupled to the plate 140. For example, as shown in FIGS. 1 and 3A-3B, the attachment structure 134 (e.g., pin) of the check valve 130 that includes a gate valve member may be fixed (e.g., welded, screwed, bolted, or the like) to the plate 140, and the valve member 132 may be rotatably coupled to the attachment structure 134 (e.g., pin) to enable the valve member 132 to rotate (e.g., swing) around the attachment structure 134 (e.g., pin) to move between the open and rest positions 306-2 and 306-1 as shown in FIGS. 3A-3B while remaining coupled to the cylindrical shell 110. In some example embodiments, the plate 140 is absent, and the check valve 130 may be coupled directly to the cylindrical shell 110 (e.g., via welding attachment, bolt attachment, screw attachment, adhesion, or the like).

As described herein, a "granular material" may include particulate matter comprising particles. The granular material may be a powder-like substance that may flow freely when shaken or tilted. In some example embodiments, the granular material may have a particle size (e.g., particle diameter) between about 0.1 nm to about 500 nm. In some example embodiments, the granular material may have a particle size (e.g., particle diameter) between about 0.1 μm to about 200 nm. In some example embodiments, the granular material may have a particle size between about 0.5 mm to about 1 mm, about 0.25 mm to about 0.5 mm, about 125 nm to about 250 nm, about 60 nm to about 125 nm, about 4 nm to about 60 nm, about 1 nm to about 4 nm, any combination thereof, or the like.

In some example embodiments, the granular material may have an average particle size of about 50 μm. In some example embodiments, the granular material may have an average particle size of about 200 μm. In some example embodiments, the granular material may have an average particle size of about 400 nm.

The granular material may partially or entirely comprise particles having a maximum diameter that is between about 0.1 nm to about 1 nm. The granular material may partially or entirely comprise particles having a maximum diameter that is equal to or greater than 1 μm.

The granular material may contain and/or partially or completely comprise at least one substance. In some example embodiments, the at least one substance is a consumer product.

In some example embodiments, the at least one substance and/or the consumer product is an inert powder material. In some example embodiments, the granular material may contain and/or partially or completely comprise a substance that is microcrystalline cellulose (MCC).

In some example embodiments, the at least one substance and/or the consumer product includes (e.g., partially or completely comprises) an oral product.

In some example embodiments, the oral product is an oral tobacco product, an oral non-tobacco product, an oral cannabis product, or any combination thereof. The oral product may be in a form of loose material (e.g., loose cellulosic material), shaped material (e.g., plugs or twists), pouched material, tablets, lozenges, chews, gums, films, any other oral product, or any combination thereof.

The oral product may include chewing tobacco, snus, moist snuff tobacco, dry snuff tobacco, other smokeless tobacco and non-tobacco products for oral consumption, or any combination thereof.

Where the oral product is an oral tobacco product including smokeless tobacco product, the smokeless tobacco product may include tobacco that is whole, shredded, cut, granulated, reconstituted, cured, aged, fermented, pasteurized, or otherwise processed. Tobacco may be present as whole or portions of leaves, flowers, roots, stems, extracts (e.g., nicotine), or any combination thereof.

In some example embodiments, the oral product includes a tobacco extract, such as a tobacco-derived nicotine extract, and/or synthetic nicotine. The oral product may include nicotine alone or in combination with a carrier (e.g., white snus), such as a cellulosic material. The carrier may be a non-tobacco material (e.g., microcrystalline cellulose) or a tobacco material (e.g., tobacco fibers having reduced or eliminated nicotine content, which may be referred to as "exhausted tobacco plant tissue or fibers"). In some example embodiments, the exhausted tobacco plant tissue or fibers can be treated to remove at least 25%, 40%, 50%, 60%, 70%, 75%, 80%, 85%, 90%, or 95% of the nicotine. For example, the tobacco plant tissue can be washed with water or another solvent to remove the nicotine.

In other example embodiments, the oral product may include cannabis, such as cannabis plant tissue and/or cannabis extracts. In some example embodiments, the cannabis material includes leaf and/or flower material from one or more species of cannabis plants and/or extracts from the one or more species of cannabis plants. The one or more species of cannabis plants may include *Cannabis sativa, Cannabis indica,* and/or *Cannabis ruderalis*. In some example embodiments, the cannabis may be in the form of fibers. In some example embodiments, the cannabis may include a cannabinoid, a terpene, and/or a flavonoid. In some example embodiments, the cannabis material may be a cannabis-derived cannabis material, such as a cannabis-derived cannabinoid, a cannabis-derived terpene, and/or a cannabis-derived flavonoid.

The oral product (e.g., the oral tobacco product, the oral non-tobacco product, or the oral cannabis product) may have various ranges of moisture. In some example embodiments, the oral product is a dry oral product having a moisture content ranging from 5% by weight to 10% by weight. In some example embodiments, the oral product has a medium moisture content, such as a moisture content ranging from 20% by weight to 35% by weight. In some example embodiments, the oral product is a wet oral product having a moisture content ranging from 40% by weight to 55% by weight.

In some example embodiments, oral product may further include one or more elements such as a mouth-stable polymer, a mouth-soluble polymer, a sweetener (e.g., a synthetic sweetener and/or a natural sweetener), an energizing agent, a soothing agent, a focusing agent, a plasticizer, mouth-soluble fibers, an alkaloid, a mineral, a vitamin, a dietary supplement, a nutraceutical, a coloring agent, an amino acid, a chemesthetic agent, an antioxidant, a food-grade emulsifier, a pH modifier, a botanical, a tooth-whitening agent, a therapeutic agent, a processing aid, a stearate, a wax, a stabilizer, a disintegrating agent, a lubricant, a preservative, a filler, a flavorant, flavor masking agents, a bitterness receptor site blocker, a receptor site enhancers, other additives, or any combination thereof.

In some example embodiments, the granular material may contain any product or substance. For example, the granular material may contain confectionary products, food products, medicines, or any other product.

FIG. 4 is a cross-sectional view of a doser mechanism and a granular material reservoir, according to some example embodiments. The doser mechanism 100 shown in FIG. 4 may be the doser mechanism according to any of the example embodiments, including the doser mechanism 100 shown in FIGS. 1, 2, 3A, and 3B.

As shown in FIG. 4, in some example embodiments, the doser mechanism 100 may be coupled (e.g., attached, fixed, connected, etc.) to a reservoir 400 (also referred to herein as a granular material reservoir, material reservoir, or the like) which may include a reservoir structure 402 (e.g., reservoir bin) having one or more inner sidewall surfaces 402*i* that at least partially define an open reservoir enclosure 402*e* (also referred to as a reservoir space, or the like) having an open top end 402*s* configured to receive granular material 404 into the reservoir enclosure 402*e* there through. The reservoir 400 further has an outlet opening 406 extending through a thickness 402*t* of a sidewall of the reservoir structure 402, between an inner sidewall surface 402*i* and an opposing outer sidewall surface 402*o* thereof, to establish fluid communication between the reservoir enclosure 402*e* and an exterior of the reservoir 400 independently of the open top end 402*s*.

As shown in FIG. 4, the doser mechanism 100 may be coupled to the reservoir 400 (e.g., based on the hollow cylinder 102 and/or bracket plate 190 being attached to one or more portions of the reservoir structure 402) so that the first opening 180-1 of the cylindrical shell 110 is in fluid communication with the reservoir enclosure 402*e* via the outlet opening 406. As shown, the first opening 180-1 may be directly adjacent to the outlet opening 406 and aligned to overlap the outlet opening 406 (e.g., in a horizontal direction that is the Z direction). The doser mechanism 100 may be coupled to the reservoir 400 via welding, bolting, adhesion, or the like.

Still referring to FIG. 4, at least a portion of the auger conveyor 120, specifically at least a portion of one or more augers 122 thereof, may extend from the enclosure 102*e* of the cylindrical shell 110, through the first opening 180-1, through the outlet opening 406, and into the reservoir enclosure 402*e* when the doser mechanism 100 is coupled to the reservoir 400. In such a configuration, the auger conveyor 120 may be configured to operate (e.g., cause the one or more augers 122 to rotate 390 around their respective longitudinal axes 129) to move at least some of the granular material 404 in the reservoir enclosure 402*e*, as granular material 308, from the reservoir enclosure 402*e* and into the enclosure 102*e* via the outlet opening 406 and the first opening 180-1, and to further move said granular material 308 through the enclosure 102*e* from the first opening 180-1 to the second opening 180-2 and further move said granular material 308 through the second opening 180-2 and out of the doser mechanism 100 as supplied granular material 310. While the check valve 130 is not illustrated in FIG. 4, it will be understood that the doser mechanism 100 as shown in FIG. 4 may be any of the example embodiments of the doser mechanism and may include a check valve 130 according to any of the example embodiments, such that the supplied granular material 310 is supplied due to granular material 308 exerting a force 380 to move the valve member 132 to an open position 306-2 (e.g., based on granular material 308 being pressurized within the enclosure 102e proximate and/or adjacent to the second opening 180-2).

As further shown in FIG. 4, based at least in part upon the second opening 180-2 being located at an upper side of the hollow cylinder 102, such that the central axis 302 of the second opening 180-2 is at least partially extending in the +Y direction and establishes an angle 304 of between at least 0 degrees and 90 degrees with the horizontal direction (e.g., X direction) and/or horizontal plane (e.g., X-Z plane), the granular material 310 that is supplied through the second opening 180-2 may fall along the outer cylinder surface 102o and further fall away from the doser mechanism 100 in the direction of gravity "g" (e.g., the —Y direction).

Still referring to FIG. 4, the drive motor 124 may be mechanically coupled to the one or more augers 122, directly or via a drive transmission 126 at one or both of a first end 122-a of the one or more augers 122 that is proximate to the first opening 180-1 or a second end 122-b of the one or more augers 122 that is proximate to the second opening 180-2. The drive motor 124 may be mechanically coupled to the one or more augers 122 via a drive transmission 126, which may be a gear box, driveshaft, drive belt, meshed gear set, or the like. Where the drive motor 124 is coupled to the second end 122-b of the one or more augers 122, the drive transmission 126 may extend through the end cap 104 (e.g., via an opening extending through the thickness of the end cap 104) and/or through the hollow cylinder 102 e.g., via an opening extending through the thickness 102t of the hollow cylinder 102). In some example embodiments, the drive transmission 126 may include a flex coupler.

FIGS. 5A, 5B, 5C, 5D, and 5E are cross-sectional views of the doser mechanism 100 of FIG. 1 along cross-sectional view line III-III' with various check valves, according to some example embodiments. The doser mechanism 100 shown in FIGS. 5A-5E may be the doser mechanism according to any of the example embodiments, including the doser mechanism 100 shown in FIGS. 1 and 2.

Figure 5A:
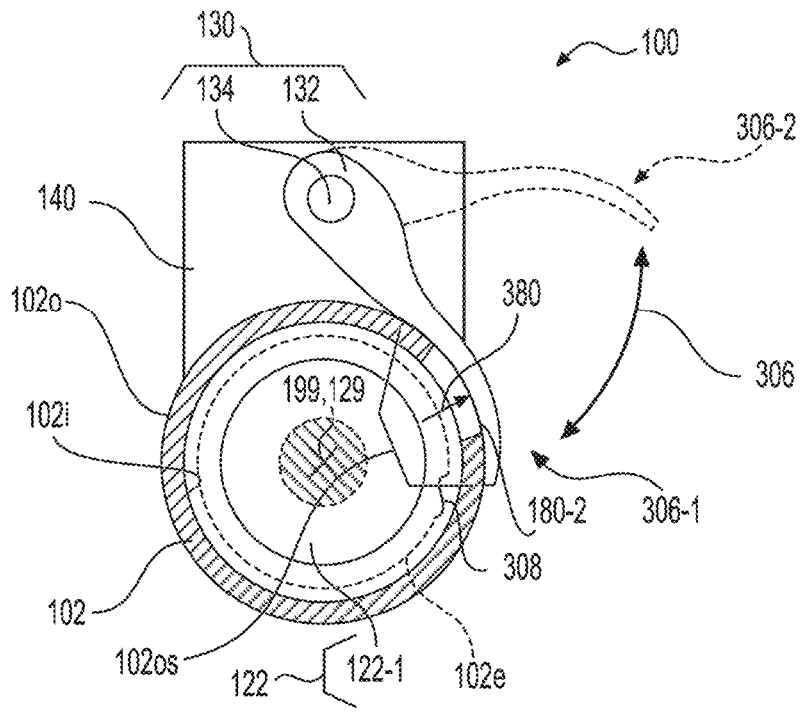
FIGS. 5A, 5B, 5C, 5D, and 5E are cross-sectional views of the doser mechanism of FIG. 1 along cross-sectional view line III-III' with various check valves, according to some example embodiments.

Referring to FIG. 5A, in some example embodiments, and unlike the example embodiments shown in at least FIGS. 1-3B, the doser mechanism 100 may include an auger conveyor 120 that includes a single auger 122-1, instead of a multiple-auger arrangement such as shown in at least FIGS. 1-3B (e.g., auger 122-2 is absent). The hollow cylinder 102 may be shaped to enclose the single auger 122-1 such that the single auger 122-1 may extend coaxially or substantially coaxially with the central longitudinal axis 199 within the enclosure 102e (e.g., central longitudinal axes 129 and 199 may be the same axis), as shown in FIG. 5A for example. However, example embodiments are not limited thereto and the single auger 122-1 may extend paraxially with the central longitudinal axis 199 along a separate, parallel longitudinal axis 129.

Figure 5B:
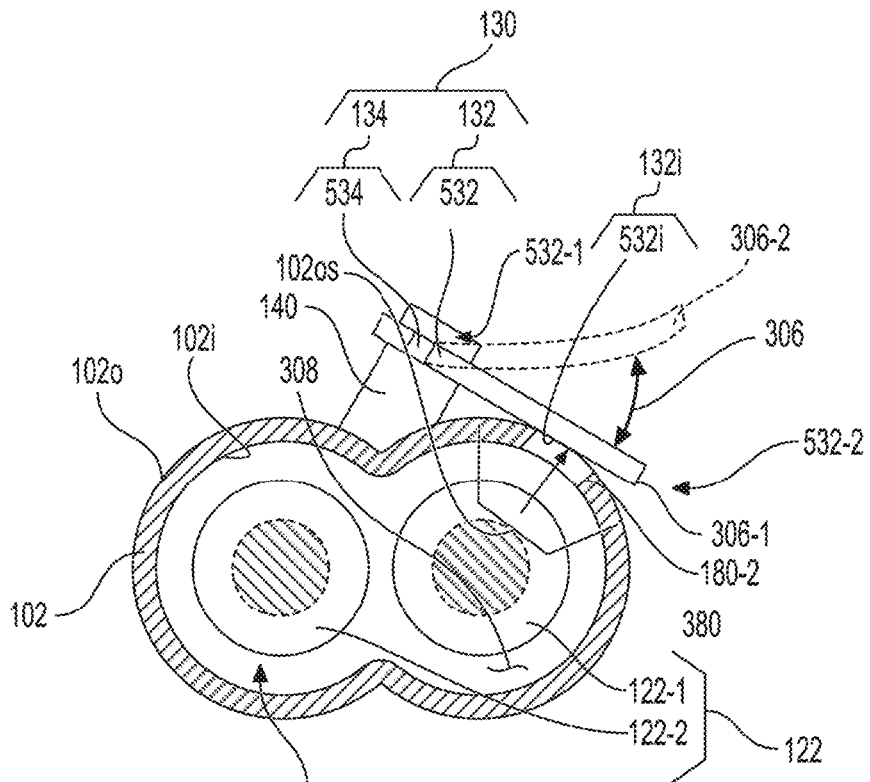

Referring to FIG. 5B, in some example embodiments, the check valve 130 may include a valve member 132 that is a reed valve 532 that is configured to flex due to the application of force 380 to an inner surface 532i thereof to move 306 between the rest position 306-1 and the open position 306-2. As shown, the reed valve 532 may have a proximate end 532-1 that is fixed to the cylindrical shell 110 via an attachment structure 134 that is a fastener 534, which may be a weld, bolt, adhesive, or the like which fixes the proximate end 532-1 of the reed valve 532 to the cylindrical shell 110. As further shown, the reed valve 532 may have a distal end 532-2 that is opposite to the proximate end 532-1 and which is a free end which at least partially covers the second opening 180-2 when the reed valve 532 is in the rest position 306-1 and which flexes to move 306 to the open position 306-2 in response to a force 380 applied on the distal end 532-2 of the reed valve 532 (e.g., at inner surface 532i thereof) through the second opening 180-2 (e.g., by granular material 308 caused to move from the enclosure 102e and through the second opening 180-2 by the auger conveyor 120). In response to an absence or reduction of the force 380 on the distal end 532-2, the reed valve 532 may relax from the open position 306-2 to the rest position 306-1 to at least partially cover the second opening 180-2 and thus to at least partially mitigate granular material drainage from the enclosure 102e through the second opening 180-2.

The reed valve 532 may comprise a resilient material configured to at least partially reversibly flex and relax in response to application and removal of force 380 on the distal end 532-2 of the reed valve 532. Such resilient material may include, for example, carbon fiber material, metal (e.g., stainless steel, carbon steel, aluminum, etc.), plastic material, polymer composite material, fiberglass material, or the like.

Figure 5C:
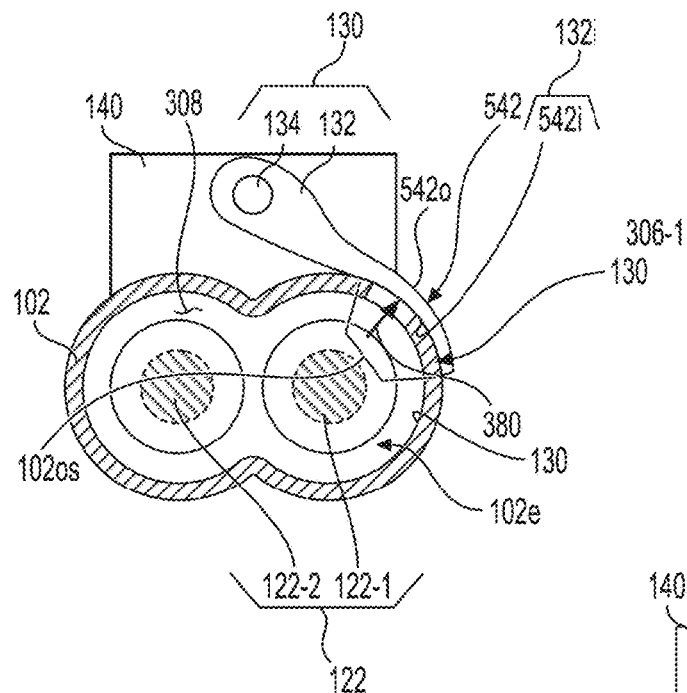
Figure 5D:
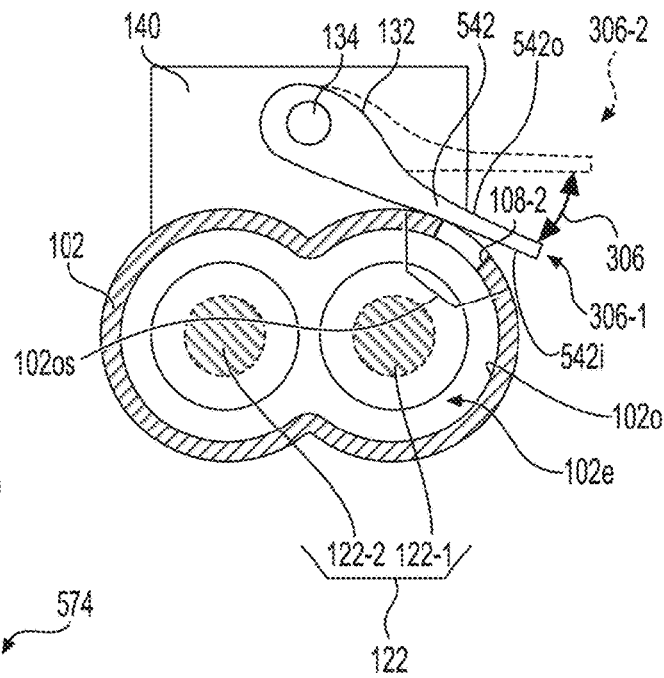

Referring to FIGS. 5C-5D, in some example embodiments, the valve member 132 may include a cover plate 542 that has an inner cover surface 542i (which may be at least a part of the inner surface 132i of the valve member 132) and an outer cover surface 542o that is opposite to the inner cover surface 542i. The cover plate 542 may be configured to cover the second opening 180-2 such that the inner cover surface 542i is proximate to the second opening 180-2 in relation to the outer cover surface 542o in response to the valve member 132 being in the rest position 306-1 as shown in FIG. 5C.

As shown in FIGS. 5C-5D, in some example embodiments, the outer cylinder surface 102o of the shell 102 has an outer shape, curvature, or contour. For example, as shown in at least FIGS. 1 and 5C, the cylindrical shell 110 may have a cylindrical shape such that the outer cylinder surface 102o has a contour, or curvature around the central longitudinal axis 199.

Referring particularly to FIG. 5C, in some example embodiments, the inner cover surface 542i has a surface shape, contour, or curvature that is complementary to the surface shape, contour, or curvature of at least a portion of the outer cylinder surface 102o that is adjacent to and/or surrounding the second opening 180-2. For example, in FIG. 5C, the inner cover surface 542i is curved in a concave curvature that is complementary to the convex curvature of the portion of the outer cylinder surface 102o that is covered by the cover plate 542 when the valve member 132 is in the rest position 306-1. As a result, and as shown in at least FIG. 5C, the inner cover surface 542i of the cover plate 542 may lie flush with the portion of the outer cylinder surface 102o in response to the valve member 132 being in the rest position 306-1, such that the cover plate 542 may establish a complete or substantially complete covering and/or sealing of the second opening 180-2 to at least partially mitigate or completely prevent granular material from draining from the enclosure 102e through the second opening 180-2.

Referring now particularly to FIG. 5D, in some example embodiments, at least the inner cover surface 542i is planar or has a surface shape, contour or curvature that is not complementary to the surface shape, contour or curvature of the portion of the outer cylinder surface 102o that is covered by the cover plate 542 when the valve member 132 is in the rest position 306-1. As a result, the inner cover surface 542i of the cover plate 542 may not lie flush with the aforementioned portion of the outer cylinder surface 102o in response to the valve member 132 being in the rest position 306-1. However, the inner cover surface 542i may still establish an at least partial seal of the second opening 180-2 when the valve member 132 is in the rest position 306-1 that is sufficient to create the aforementioned back pressure to retain the granular material 308 in the enclosure 102e when the one or more augers 122 are not rotating 390 (e.g., the auger conveyor is in the "off" operating state), such that the cover plate 542 may still at least partially mitigate or completely prevent granular material from draining from the enclosure 102e through the second opening 180-2.

Still referring to FIG. 5D, in some example embodiments, the portion 102os of the outer cylinder surface 102o that may be in direct contact with at least a portion of the check valve 130 (e.g., an inner cover surface 542i of the cover plate 542) when the valve member 132 is in the rest position 306-1 may be a flat, planar surface, while a remainder portion of the outer cylinder surface 102o that is not in direct contact with the portion of the check valve 130 (e.g., the inner cover surface 542i of the valve member 132) when the valve member 132 is in the rest position 306-1 may have a curved contour (e.g., convex curvature), so that a flat, planar inner cover surface 542i of the valve member 132 shown in FIG. 5D may lie flush with the planar portion 102os of the outer cylinder surface 102o when the valve member 132 is in the rest position 306-1.

Figure 5E:
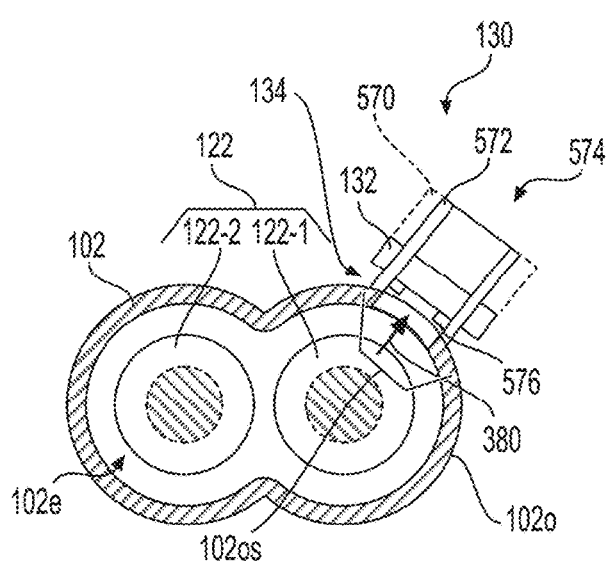

Referring to FIG. 5E, in some example embodiments, the check valve 130 may be a different type of check valve than a check valve having a swinging gate "trap-door" valve member 132 as shown in at least FIGS. 1 and 3A-3B, including, for example a ball check valve, a diaphragm check valve, a lift check valve, an in-line check valve, a reed valve, or the like. As shown, for example, the check valve 130 may have a body 572 fixed to the outer cylinder surface 102o of the hollow cylinder 102 surrounding the second opening 180-2 via an attachment structure 134 that may include a weld, a bolt attachment, an adhesive, or the like, where the body 572 has one or more surfaces defining an inner conduit 574 extending from the second opening 180-2 to an exterior of the doser mechanism 100 and further including an inner step 576 extending into the inner conduit 574. The check valve 130 further includes the valve member 132 within the inner conduit 574 and biased against the inner step 576 by a spring 570 to close the check valve 130 such that the valve member 132 is in the rest position 306-1. In response to application of force 380 through the second opening 180-2 onto the valve member 132, which may be a valve disk, where the magnitude of force 380 exceeds the spring force applied by the spring 570 onto the valve member 132, the valve member 132 may be moved away from the inner step 576 to open an annular passage from the second opening 180-2 to the inner conduit 574 to enable granular material 308 to move through the check valve 130 via the inner conduit 574 to the exterior of the doser mechanism 100. In response to the force 380 ceasing or being reduced to be less than the spring force, the spring 570 may push the valve member 132 against the inner step 576 to at least partially seal the second opening 180-2.

Accordingly, it will be understood that the check valve 130 may include various types of check valves 130 configured to expose (e.g., open) or cover (e.g., close) the second opening 180-2 based on whether the auger conveyor 120 is operating to cause granular material to move through the second opening 180-2 to apply force 380 on the valve member 132.

Figure 6A:
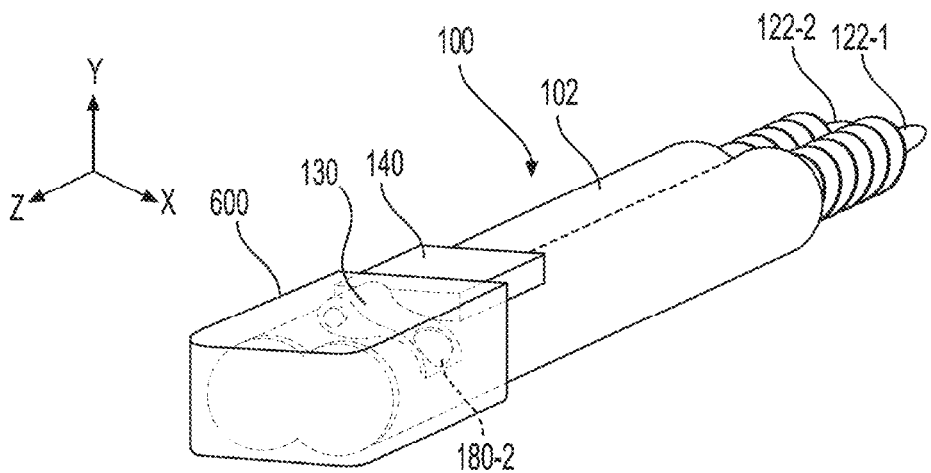
FIGS. 6A, 6B, and 6C are perspective and cross-sectional views of a doser mechanism that includes a sheath, according to some example embodiments.
Figure 6B:
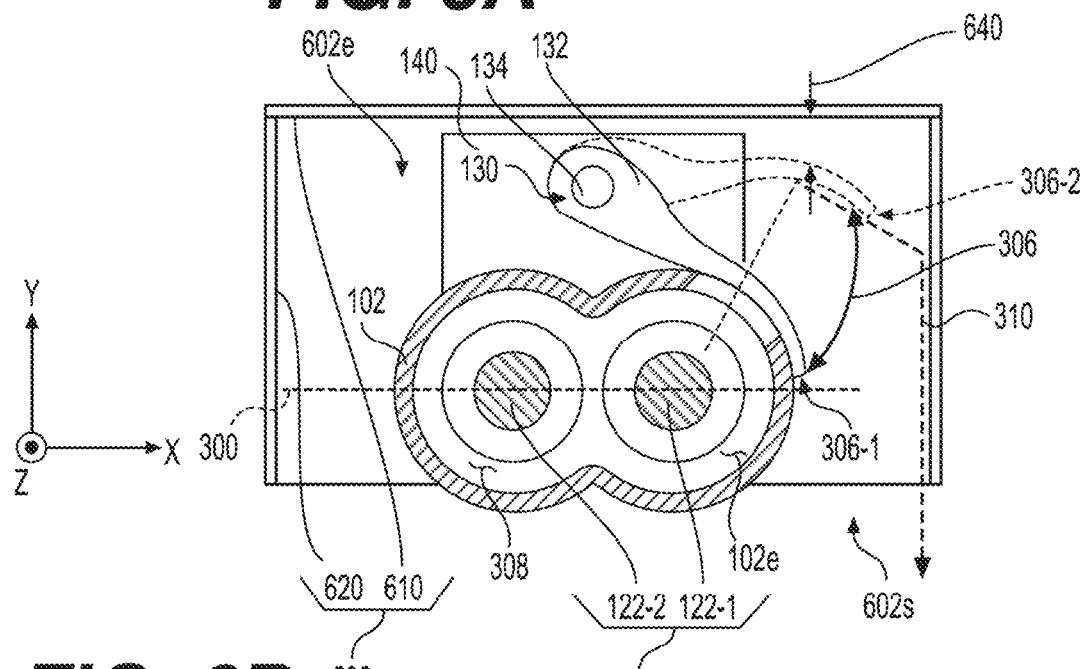
Figure 6C:
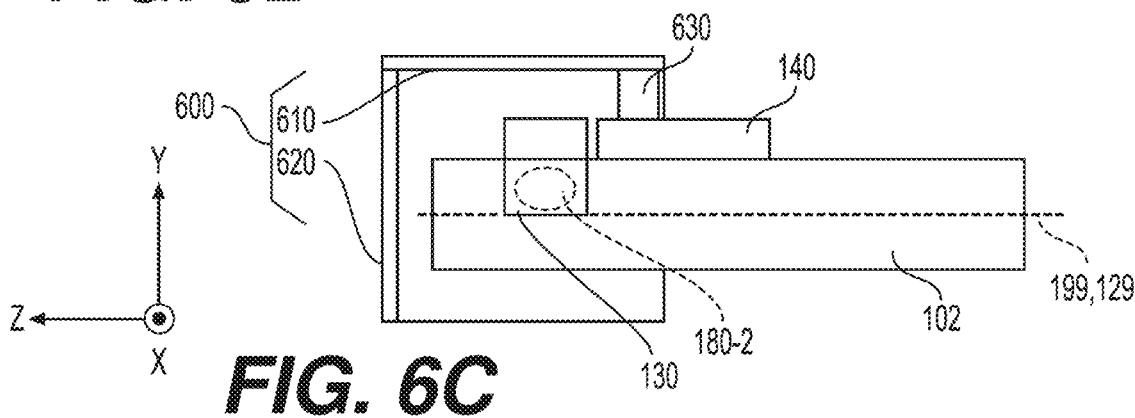

FIGS. 6A, 6B, and 6C are perspective and cross-sectional views of a doser mechanism 100 that includes a sheath structure 600, according to some example embodiments. The doser mechanism 100 shown in FIGS. 6A-6C may be the doser mechanism according to any of the example embodiments, including the doser mechanism 100 shown in FIGS. 1-5E.

Referring to FIGS. 6A-6C, the doser mechanism 100 may include a sheath structure 600 overlapping the second opening 180-2 and the check valve 130 in at least a first vertical direction (e.g., the +Y direction) along a vertical axis (e.g., the Y axis) that is perpendicular to the central longitudinal axis 199. As further shown, the sheath structure 600 may further overlap the second opening 180-2 and the check valve 130 in opposite horizontal directions that are orthogonal to the vertical axis (e.g., the +X and −X directions). Further, as shown, the sheath structure 600 may overlap the end cap 104 in the +Z direction such that the second end 102-2 of the hollow cylinder 102 is between the first end 102-1 and at least a portion of the sheath structure 600. Accordingly, the sheath structure 600, which may be formed by sidewalls 620 and top walls 610 and may be further formed by a connection plate 630 which may be a back wall, may establish (e.g., define) a partial enclosure 602e having a bottom opening 602s.

The sheath structure 600 may be fixed to the rest of the doser mechanism 100 based on being fixed to the cylindrical shell 110. For example, as shown in at least FIG. 6C, the sheath structure 600 may be connected to the plate 140 via a connection plate 630, may be directly connected to the hollow cylinder 102 via the connection plate 630, or the like.

As shown in at least FIG. 6B, the sheath structure 600 may be configured to at least partially enclose the check valve 130 such that, when the valve member 132 is in the open position 306-2, the inner surface of the top wall 610 is spaced apart from contact with the valve member 132 by at least a certain spacing distance 640 in the vertical direction (e.g., +Y direction).

Still referring to FIGS. 6A-6C, and as particularly shown in FIG. 6B, the second opening 180-2 may be configured to direct granular material 308 moving through the second opening 180-2 as supplied granular material 310 to move at least partially in a first vertical direction (e.g., the +Y direction). While the valve member 132, when in the open position 306-2, may at least partially redirect the supplied granular material 310 into an opposite, second vertical direction (e.g., the −Y direction), the sheath structure 600 may be configured to cause the supplied granular material 310 moving through the second opening 180-2 at least partially in the first vertical direction (e.g., +Y direction) to be redirected to move in at least partially in the second vertical direction that is opposite to the first vertical direction (e.g., the —Y direction). As shown, the supplied granular material 310 may move through the second opening 180-2 in both the +Y direction and the +X direction, and the sheath structure 600, alone or in combination with the valve member 132, may redirect the supplied granular material 310 that exits the second opening 180-2 from moving in the +Y and +X directions to move in the —Y direction and with reduced movement in the −X and +X directions. As a result, the sheath structure 600 may redirect the supplied granular material 310 to move in a particular direction to be supplied into an article of packaging (e.g., an open enclosure defined by packaging material), as described further with reference to FIGS. 7-11.

FIG. 7 is a schematic view of a packaging machine 700 that includes at least one doser mechanism, according to some example embodiments. FIGS. 8A, 8B, 8C, 8D, and 8E are expanded perspective views of respective regions A, B, C, D, and E of the packaging machine of FIG. 7, according to some example embodiments.

Referring to FIGS. 7 and 8A-8E, the doser mechanism 100 according to any of the example embodiments may be included in a packaging machine 700 configured to supply granular material into one or more articles of packaging material (e.g., one or more folded strips of packaging material defining separate, respective open enclosures) may include "n" parallel process streams (e.g., process streams 1 to n) and thus may include "n" doser mechanisms 702-1 to 702-n that are configured to supply granular material 310 into separate, respective "n" articles of packaging in separate, respective "n" parallel process streams, thereby enabling the packaging machine 700 to form packages of granular material in "n" parallel processes. While n is shown to be equal to 5 in FIGS. 8A-8E and also FIG. 9, it will be understood that "n" may be any positive integer equal to or greater than 1 (e.g., n may be equal to 1, 2, 3, 4, 5, 6, 7, 8, 9, 10, or any integer greater than 10 in a given packaging machine 700).

Each of the doser mechanisms 702-1 to 702-n may be a doser mechanism 100 according to any of the example embodiments, including any of the example embodiments of the doser mechanism 100 as shown in FIGS. 1-6C. As further shown in FIG. 7, the packaging machine 700 may include a reservoir 400, which may be the same as the reservoir 400 described with reference to FIG. 4, and the auger conveyor 120 of each doser mechanism 100 may be configured to draw granular material 404 from the reservoir 400 to move through the respective doser mechanism 100 as granular material 410 and to be supplied through the second opening 180-2 of the respective doser mechanism 100 as supplied granular material 310. In some example embodiments, the packaging machine 700 includes multiple reservoirs 400 from which separate, respective sets of one or more doser mechanisms 702-1 to 702-n may be configured to draw granular material.

Figure 8A:
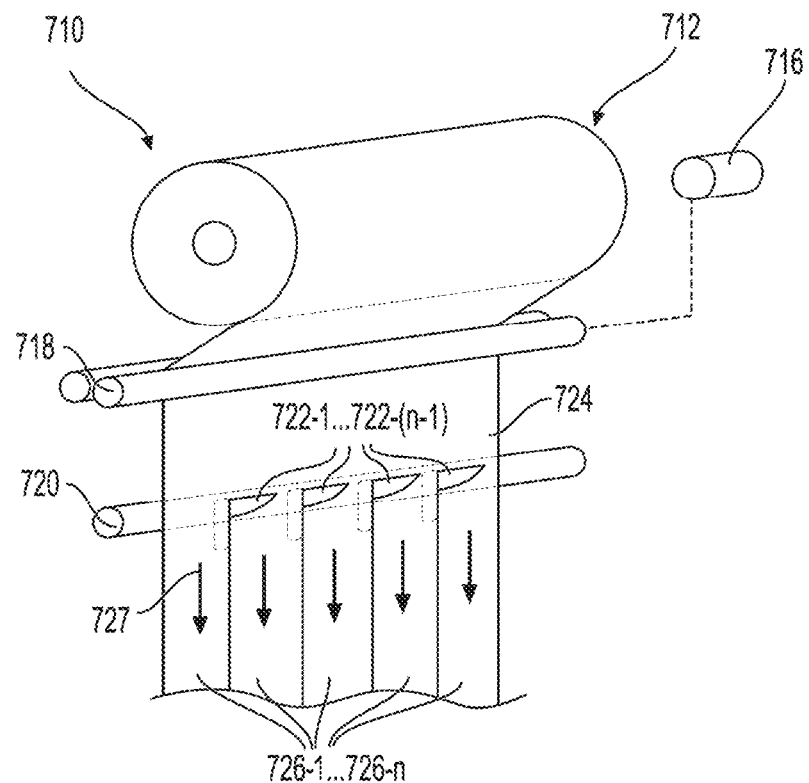
FIGS. 8A, 8B, 8C, 8D, and 8E are expanded perspective views of respective regions A, B, C, D, and E of the packaging machine of FIG. 7, according to some example embodiments.
Figure 8B:
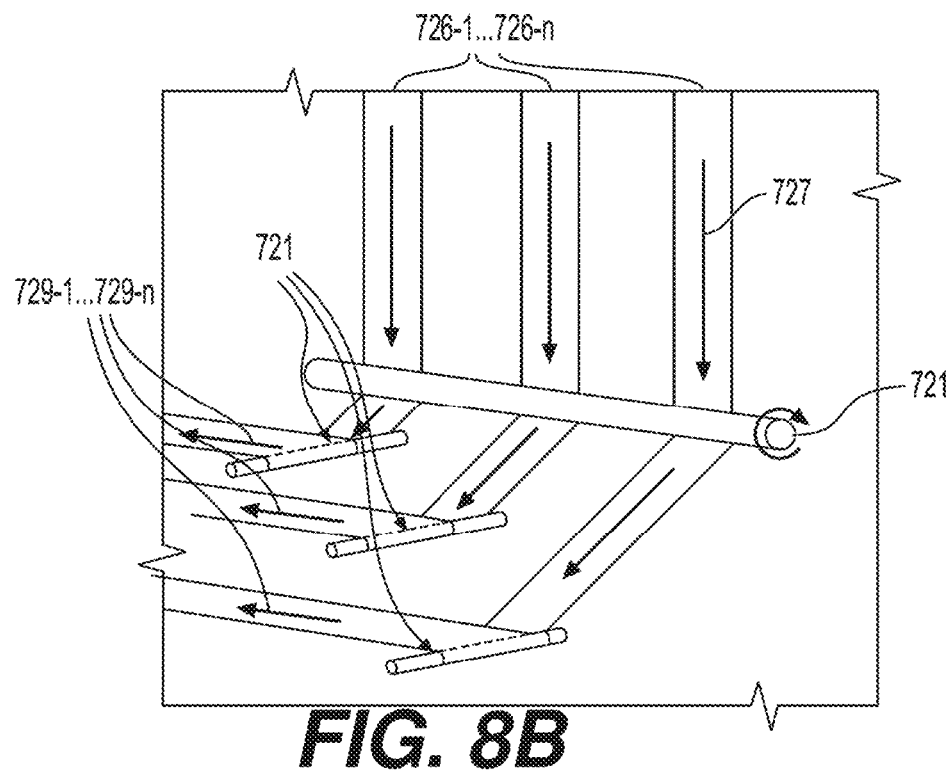

Referring now to FIG. 7 and FIGS. 8A-8B, the packaging machine 700 may include a packaging supply device 710 configured to supply an article of packaging (e.g., one or more strips of packaging material) that may define an open enclosure in which granular material is supplied by the doser mechanism 100 as supplied granular material 310. As shown, the packaging supply device 710 may include a roll 712 of a sheet of packaging material 724, where packaging supply device 710 may include a drive motor 716 (e.g., a servomotor) which may be configured to cause the roll 712 to rotate around its central axis (e.g., based on driving rotation of one or more rollers 718 of packaging supply device 710) and cause the sheet of packaging material 724 to be fed from the roll 712. In some example embodiments, the sheet of packaging material 724 may include a sheet of any suitable packaging material, including a sheet of paper material (e.g., cellulose), a sheet of plastic material (e.g., low density polyethylene (LDPE/LLDPE), high density polyethylene HDPE, polypropylene), a sheet of metal foil, or the like. In some example embodiments, the packaging material may be referred to as a "wrapper" material.

As shown, the one or more rollers 718, or one or more other rollers of the packaging machine 700, may be configured to redirect the sheet of packaging material 724 that is fed from the roll 712 to move to, and in contact with, a cutting assembly 720 so that the sheet of packaging material 724 is cut in a local feed direction 727 (e.g., cut lengthwise) into separate strips 726-1 to 726-n of packaging material (n=5 in FIG. 8A). As shown, the cutting assembly 720 includes "n−1" blades 722-1 to 722-(n−1) which may be metal blades (e.g., steel blades) and which may be spaced apart from each other in a direction perpendicular to the local feed direction 727 of the sheet of packaging material 724 and aligned with the respective cutting edges thereof facing opposite to the local feed direction 727. As a result, the blades 722-1 to 722-(n−1) may cut the sheet of packaging material 724 lengthwise into "n" strips 726-1 to 726-n as the sheet of packaging material 724 is fed from the roll 712 and thus fed from the packaging supply device 710 to other portions of the packaging machine 700. As shown in at least FIG. 8B, each separate strip 726-1 to 726-n of packaging material may be manipulated by the packaging machine 700 (e.g., by separate rollers 723) to be redirected in separate, respective local feed directions 729-1 to 729-n into separate, respective process streams 1 to n to form separate enclosures into which separate streams and/or amounts of granular material 310 may be supplied by separate doser mechanisms 702-1 to 702-n.

It will be understood that, when "n" equals 1, the cutting assembly 720 (and thus the blades 722-1 to 722-(n−1)) may be absent from the packaging machine 700.

Referring now to FIG. 7 and FIG. 8B, the packaging machine 700 may include rollers 721 (e.g., multiple rollers 721 as shown in FIG. 7B) that are configured to redirect the respective feed directions of the strips 726-1 to 726-n of packaging material into separate, respective local feed directions 729-1 to 729-n to be fed into separate, respective "n" process streams to be aligned with separate, respective doser mechanisms 702-1 to 702-n of the packaging machine 700. As shown, the packaging machine 700 may include multiple rollers 721 arranged to redirect (e.g., change the local feed direction by 90 degrees in various directions) separate strips 726-1 to 726-n to align (e.g., overlap in the vertical direction) with separate, respective doser mechanisms 702-1 to 702-n of the respective process streams 1 to n in the packaging machine 700.

Figure 8C:
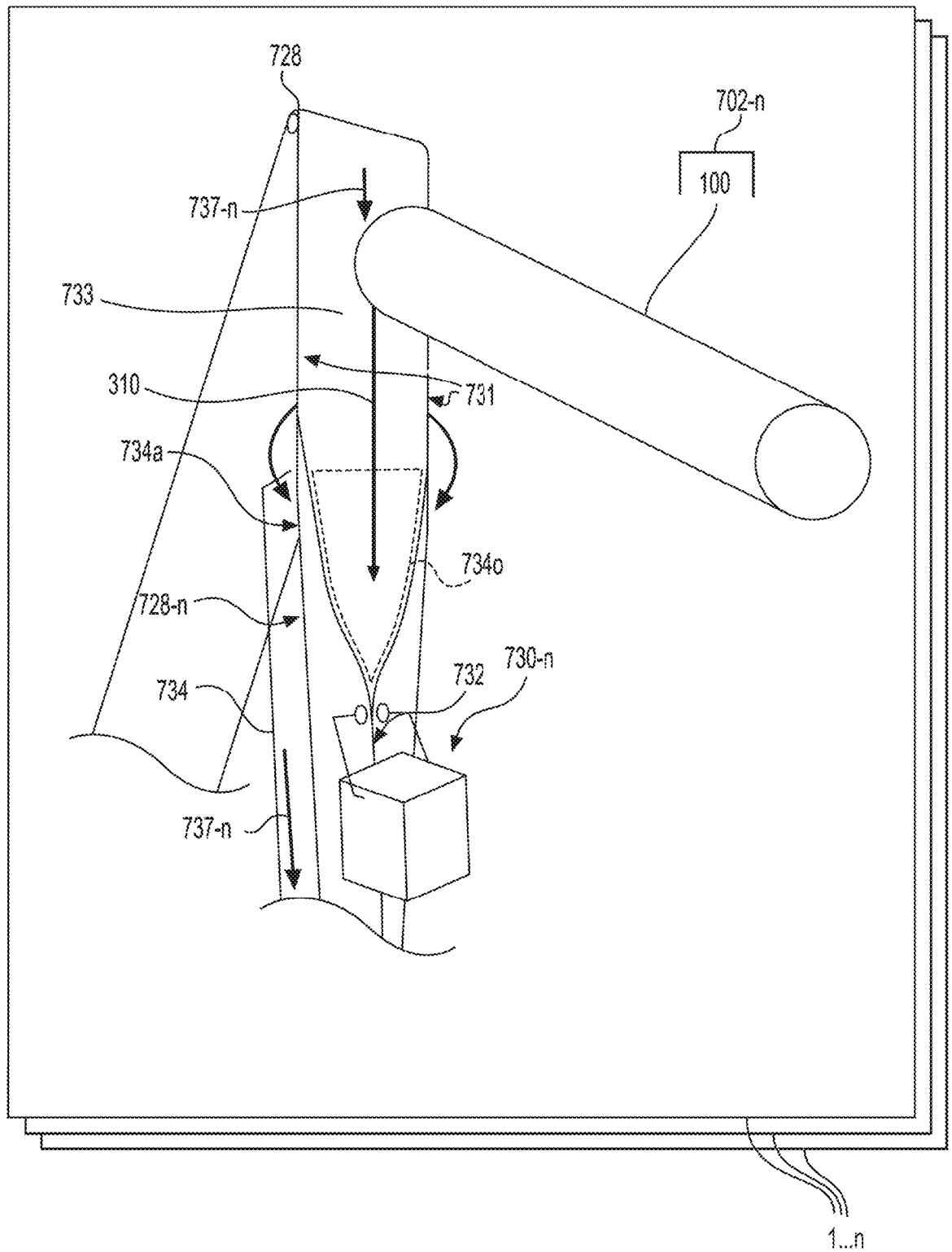
Figure 8D:
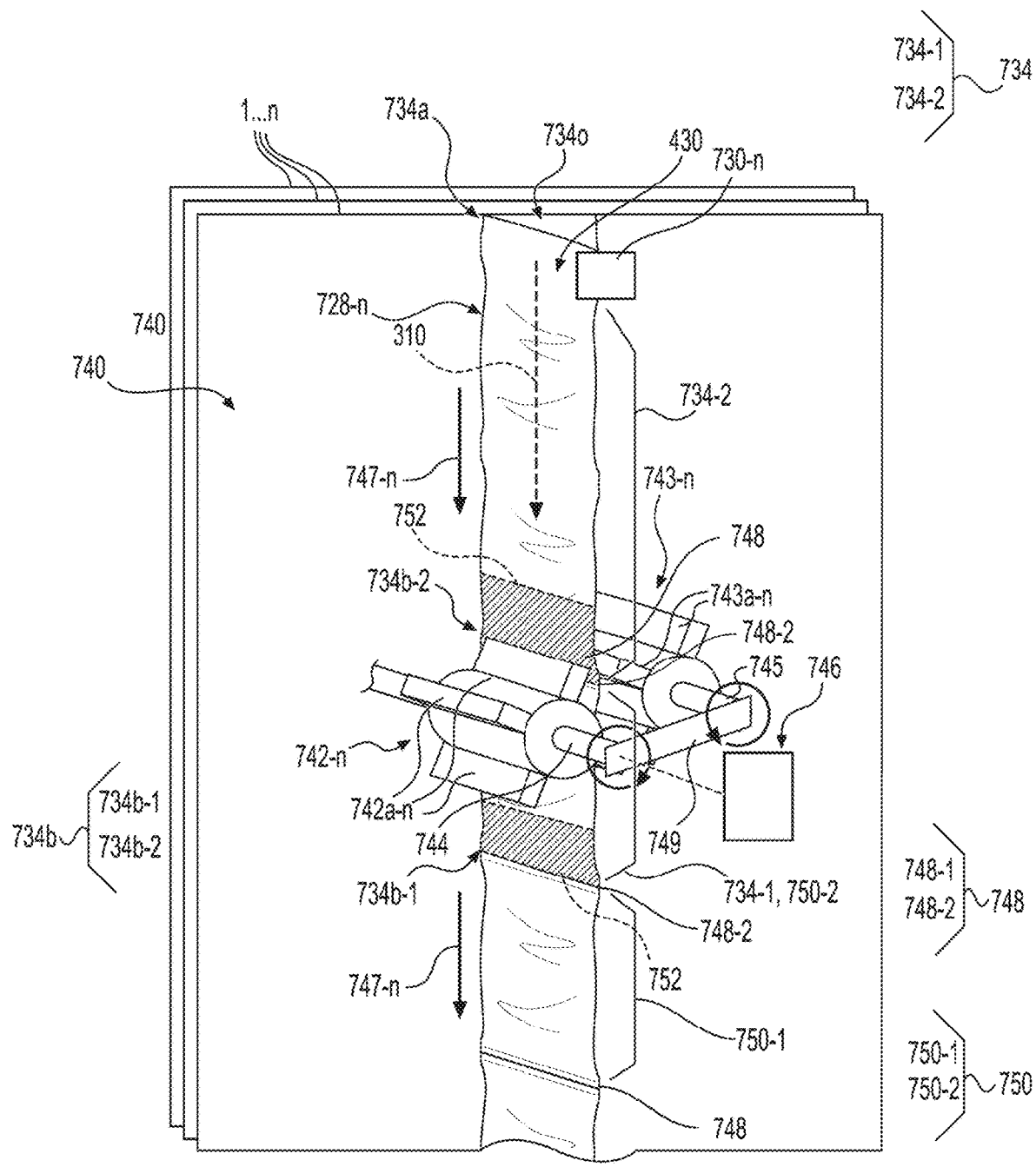
Figure 8E:
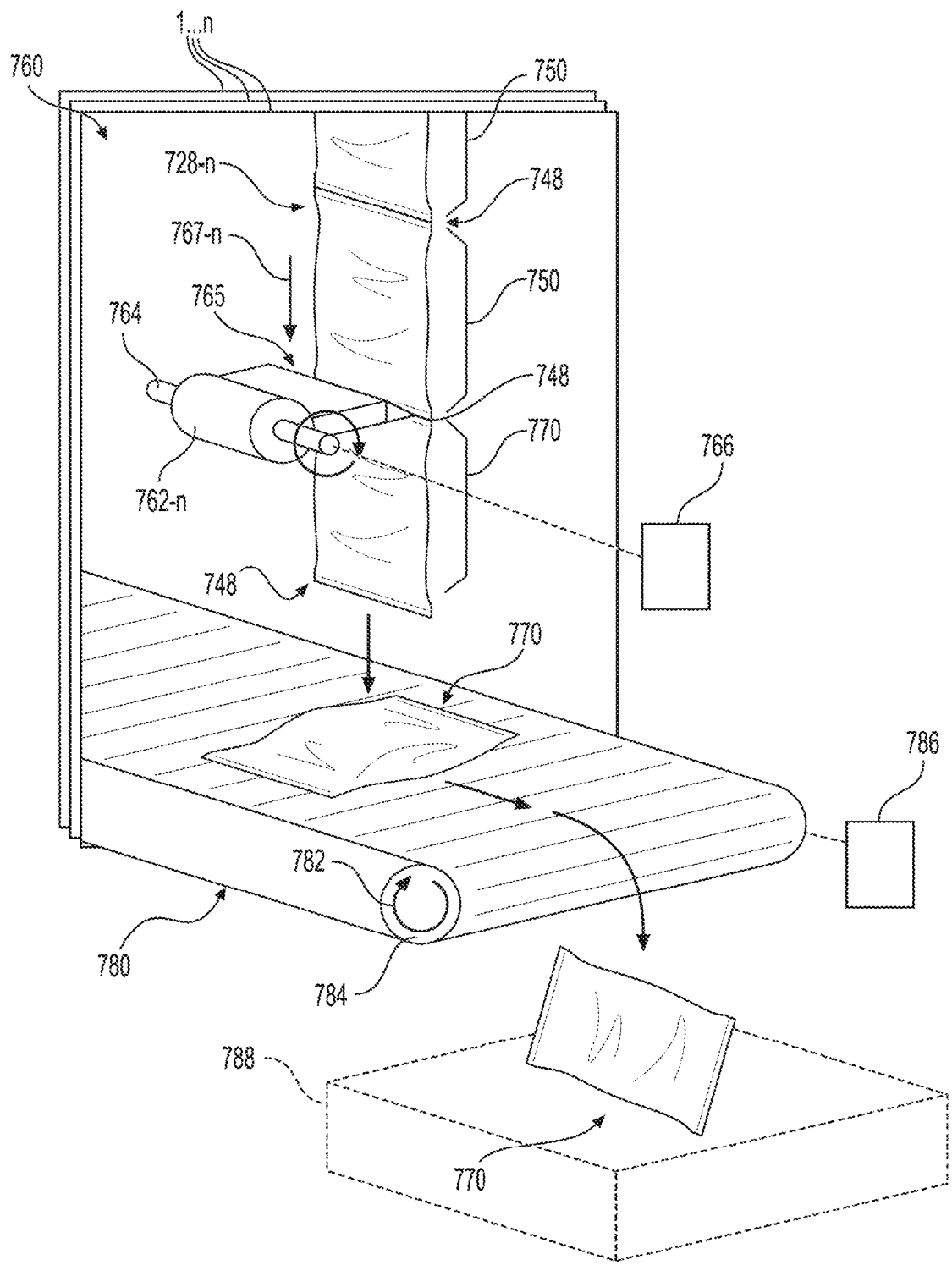

Referring now to FIGS. 8C-8E, the packaging machine 700 may be configured to define process streams 1 to n ("n" being any positive integer) that may be operated in parallel. Accordingly, elements of the "nth" process stream are described in detail with reference to at least FIGS. 8C-8E, but it will be understood that elements of the packaging machine 700 with regard to the 1 to (n−1)th process streams may be identical or substantially identical to elements of the elements of the packaging machine 700 described with regard to the nth process stream in reference to at least FIGS. 8C-8E.

Referring now to FIG. 7 and FIG. 8C, each separate strip of packaging material, of the strips 726-1 to 726-n, may be fed in a separate respective process stream of process streams 1 to n to be folded by a separate folding device 730-1 to 730-n to form a folded strip 728-1 to 728-n defining an open enclosure 734 (e.g., to form an open wrapper, article of packaging, etc.), and to be at least partially filled with a particular amount (e.g., index 752) of supplied granular material 310 that is supplied by a separate doser mechanism 702-1 to 702-n.

Each separate folding device 730-1 to 730-n may be aligned (e.g., vertically aligned) with a separate process stream of the 1 to n process streams of the packaging machine 700 and thus only the nth folding device 730-*n* with regard to the nth strip 726-*n* in the nth process stream is described, but it will be understood that elements of the folding devices 730-1 to 730-(*n*–1) with regard to strips 726-1 to 726-(*n*–1) in the 1 to (n–1)th process streams may be identical or substantially identical to elements of the nth folding device 730-*n* described with regard to the nth process stream.

Each separate doser mechanism 702-1 to 702-*n* may be aligned (e.g., vertically aligned) with a separate process stream of the 1 to n process streams of the packaging machine 700 and thus only the nth doser mechanism 702-*n* with regard to the nth strip 726-*n* in the nth process stream is described, but it will be understood that elements of the doser mechanisms 702-1 to 702-(*n*–1) with regard to strips 726-1 to 726-(*n*–1) in the 1 to (n–1)th process streams may be identical or substantially identical to elements of the nth doser mechanism 702-*n* described with regard to the nth process stream.

As shown in FIG. 8C, the nth folding device 730-*n* is configured to fold the nth strip 726-*n* of packaging material that is fed into the nth process stream to form an nth folded strip 728-*n* of packaging material that defines an open enclosure 734 defined by one or more surfaces 733 of the given nth folded strip 728-*n*. As shown in FIG. 8C, a given nth folding device 730-*n* may be configured to bring opposite side edges 731 of the given nth strip 726-*n* together and join and/or seal the opposite side edges 731 together as the given nth strip 726-*n* moves in a nth local feed direction 737-*n* past the nth folding device 730-*n* to thereby form a fin seal 732 of the opposite side edges 731 that extends in the nth local feed direction 737-*n*. The nth folding device 730-*n* may include a device configured to cause the opposite side edges 731 of the nth strip 726-*n* to be brought in contact with each other and pressed together to at least partially facilitate the formation of the fin seal 732 that extends in the nth local feed direction 737-*n*, as the nth strip 726-*n* moves past the nth folding device 730-*n* in the nth local feed direction 737-*n*, to form the nth folded strip 728-*n*. The nth folding device 730-*n* may include a device configured to attach the opposite side edges 731 of the nth strip 726-*n* together (e.g., to press the opposite side edges 731 together) to seal the opposite side edges 731 together to form the fin seal 732 that establishes the nth folded strip 728-*n* defining the open enclosure 734 therein. The nth folding device 730-*n* may include a heater (e.g., an electrically-powered resistive heater) that is configured to heat a portion of the nth folding device 730-*n* (e.g., to about 300 F) that contacts at least a portion of the nth strip 726-*n* in order to heat the opposite side edges 731 that are pressed together to cause the contacted opposite side edges 731 to adhere to each other to facilitate the formation of the fin seal 732 that extends in the nth local feed direction 737-*n*.

As shown, the open enclosure 734 of the nth folded strip 728-*n* may be closed in side directions perpendicular to the nth local feed direction 737-*n* based on the established fin seal 732 that extends parallel to the nth local feed direction 737-*n* along a side of the nth folded strip 728-*n*. The open enclosure 734 of the nth folded strip 728-*n* may be open at a proximate end that is proximate to the nth doser mechanism 702-*n* and may be closed at a distal end that is distal to the nth doser mechanism 702-*n*. In FIGS. 7 and 8C, the nth local feed direction 737-*n* is downwards in the direction of gravity, such that the open enclosure 734 of the nth folded strip 728-*n* that is formed based on folding the nth strip 726-*n* to join opposite side edges 731 thereof is open at a top end thereof and thus is understood to have a top opening 734*o* at the proximate end of the open enclosure 734. As described further with reference to FIGS. 7 and 8D, the open enclosure 734 may be closed at the distal end that is opposite the top opening 734*o* (e.g., at a bottom of the open enclosure 734) by an end seal 748.

Still referring to FIGS. 7 and 8C, and further referring to FIG. 8D, each given doser mechanism 100 of doser mechanism 702-1 to 702-*n* of the packaging machine 700 may be configured to execute an index operation to supply a particular amount (e.g., index 752) of supplied granular material 310 through the second opening 180-2 of the given doser mechanism 100 based on the auger conveyor 120 of the given doser mechanism 100 being in the "on" operating state for a particular period of time at a particular rate such that the one or more augers 122 thereof are rotating 390 at particular respective rates of rotation for the particular period of time. As shown in FIGS. 7, 8C and 8D, the nth doser mechanism 702-*n* executing an index operation supplies the particular amount (e.g., index 752) of supplied granular material 310 out of the nth doser mechanism 702-*n* and into the open enclosure 734 of the nth folded strip 728-*n*.

As shown in FIGS. 7, 8C, and 8D, the nth doser mechanism 702-*n* may be positioned to be vertically above (e.g., vertically aligned with) the top opening 734*o* at the proximate end 734*a* of the open enclosure 734 of the nth folded strip 728-*n*, such that the given nth doser mechanism 702-*n* is configured to supply supplied granular material 310 that falls from the nth doser mechanism 702-*n*, through the top opening 734*o* of the open enclosure 734 at the proximate end 734*a* thereof, and to the distal end 734*b* of the open enclosure 734 adjacent to the end seal 748 that closes the distal end 734*b* of the open enclosure 734.

The given nth doser mechanism 702-*n* may have a drive motor 124 as described with regard to the doser mechanism 100, and the drive motor 124 may be a servomotor that is controlled by a control device (e.g., control device 790 as described below) to, at particular intervals of time, rotate a driveshaft thereof at a particular rate of rotation for a particular period of time, to cause the one or more augers 122 of the nth doser mechanism 702-*n* to rotate 390 at respective rates of rotation for the particular period of time, in order to execute an index operation that causes the nth doser mechanism 702-*n* to supply a particular amount (e.g., index 752) of granular material into the open enclosure 734 of the nth folded strip 728-*n*. Each separate period of operation of the nth doser mechanism 702-*n* to supply a separate index 752 of granular material may be understood to be a separate index operation performed by the nth doser mechanism 702-*n*. The n-th doser mechanism 702-*n* may be controlled (e.g., by control device 790) to perform index operations that each have a particular start time, period of time, end time, and/or associated rate of rotation of the drive motor 124 at a particular time interval or "time spacing" between adjacent index operations.

When the auger conveyor 120 of the given nth doser mechanism 702-*n* is stopped (e.g., is in the "off" operating state, at the end of an index operation and/or between index operations), the check valve 130 of the given nth doser mechanism 702-*n* may exert a force on granular material 308 still within the enclosure 102*e* of the nth doser mechanism 702-*n* to create back pressure that causes the granular material 308 to be retained in the enclosure 102*e*, thereby stopping the supply of granular material from the nth doser mechanism 702-*n* into the open enclosure 734 and mitigating or preventing granular material 308 drainage out of the given nth doser mechanism 702-*n* upon the completion of an index operation and/or between index operations. As a result, the nth doser mechanism 702-*n* may be configured to better control tapering-off of the supplying of granular material at the end of an index operation and/or between index operations, thereby improving accuracy and precision of amounts ("indexes 752") of granular material supplied into the open enclosure 734 of the nth folded strip 728-*n* during an index operation and, based on mitigating tapering of the flow of supplied granular material 310 out of the doser mechanism 702-*n* at the completion of an index operation, reducing or preventing the flow of excess granular material into end seals 748 and or on other portions of the packaging machine 700.

As shown in FIGS. 7, 8C, and 8D, based on a particular amount (e.g., index 752) of granular material 310 being supplied by the given nth doser mechanism 702-*n* into an open enclosure 734 of the nth folded strip 728-*n* of packaging material, said open enclosure 734 may be at least partially filled at the distal end 734*b* thereof by the index 752 of granular material. For example, as shown, open enclosure 734 of the folded strip 728-*n* may be open (e.g., have opening 734*o*) at the proximate end 734*a* (e.g., top end) and may be sealed at the distal end 734*b* (e.g., bottom end) by an end seal 748. A distal (e.g., bottom) portion of the open enclosure 734 that is adjacent to the distal end 734*b* (e.g., adjacent to and at least partially defined by the end seal 748 that seals the distal end 734*b* of the open enclosure 734) may be at least partially filled with the index 752 of granular material that is supplied into the open enclosure 734 from the nth doser mechanism 702-*n*.

It will be understood, as described herein, that the nth doser mechanism 702-*n* may be controlled to perform "index" operations to supply a particular amount (e.g., index 752) of granular material into the open enclosure 734 of the folded strip 728-*n*, via the opening 734*o* at the proximate end 734*a* of the open enclosure 734, at a particular time interval that may be controlled by the control device 790, where the index operation includes the control device 790 causing the drive motor 124 of the nth doser mechanism 702-*n* to rotate for a particular period of time and at a particular rate of rotation that is associated with the one or more augers 122 of the nth doser mechanism 702-*n* causing the particular amount (e.g., index 752) of granular material to be supplied into the distal portion of the open enclosure 734 of the nth folded strip 728-*n* that is adjacent to the distal end 734*b* thereof.

Referring now to FIG. 7 and FIG. 8D, the packaging machine 700 may include a sealing device 740 that is configured to join opposing inner surfaces 739 defining opposite sides of the open enclosures 734 of the folded strips 728-1 to 728-*n* to establish respective new end seals 748-2 that each isolate at least a distal portion 734-1 of the open enclosures 734 defined by the folded strips 728-1 to 728-*n* of packaging material and adjacent to a previously-established end seal 748-1 from a remainder, proximate portion 734-2 of the open enclosures 734 to partition, in the local feed directions 747-1 to 747-*n*, the portions of the open enclosures 734 of the folded strips 728-1 to 728-*n* that each contain an index 752 of granular material into isolated sealed enclosures 750 each containing a separate, particular amount (e.g., index 752) of granular material.

As shown, the sealing device 740 may include a set of first projection devices 742-1 to 742-*n* connected via a central rod 744 and a set of second projection devices 743-1 to 743-*n* connected via a separate central rod 745 mechanically coupled to the first projection devices 742-1 to 742-*n* via meshed gears 749 to synchronize rotation of the first projection devices 742-1 to 742-*n* with the rotation (e.g., counter-rotation) of the second projection devices 743-1 to 743-*n*. The central rod 744 may be mechanically connected to a drive motor 746 (e.g., directly or via a drive transmission such as meshed gears 749) and thus may be configured to rotate around its longitudinal axis based on operation of the drive motor 746 to further cause the first projection devices 742-1 to 742-*n* to rotate around the longitudinal axis of the central rod 744. The central rod 745 may be mechanically connected to the drive motor 746 (e.g., directly or via a drive transmission such as meshed gears 749) and thus may be configured to rotate around its longitudinal axis based on operation of the drive motor 746 to further cause the second projection devices 743-1 to 743-*n* to rotate around the longitudinal axis of the central rod 745, for example in an opposite rotational direction than the first projection devices 742-1 to 742-*n*.

Each separate first projection device 742-1 to 742-*n* and second projection device 743-1 to 743-*n* may be aligned (e.g., vertically aligned and/or horizontally overlapped) with a separate nth process stream of the packaging machine 700 and thus only the portions of the sealing device 740 with regard to the nth process stream are described, but it will be understood that elements of the sealing device 740 with regard to the 1 to (n–1)th process streams may be identical or substantially identical to elements of the sealing device 740 described with regard to the nth process stream.

As shown in at least FIG. 8D, the nth first and second projection devices 742-*n* and 743-*n* may be arranged to be aligned with (e.g., horizontally overlap with) opposite sides of the nth folded strip 728-*n* that defines an open enclosure 734 containing an index 752 of granular material at a distal portion 734-1 thereof, adjacent to a distal end 734*b* of the open enclosure 734 that is closed by an end seal 748. The sealing device 740 may be located vertically below the nth doser mechanism 702-*n* of the nth process stream so that the nth folded strip 728-*n* moves downwards from the nth doser mechanism 702-*n* and nth folding device 730-*n* towards the nth first and second projection devices 742-*n* and 743-*n* of the sealing device 740 in the nth local feed direction 747-*n*.

The nth first projection device 742-*n* may include multiple pad projections 742*a*-*n* extending radially from a central axis of rotation of the nth first projection device 742-*n* (e.g., may extend radially from the central rod 744). The nth second projection device 743-*n* may include multiple pad projections 743*a*-*n* extending radially from a central axis of rotation of the nth second projection device 743-*n* (e.g., may extend radially from the central rod 745).

The nth first projection device 742-*n* may include a heater (e.g., a resistive heater) configured to heat the pad projections 742*a*-*n* (e.g., to about 300 F). The nth second projection device 743-*n* may or may not include a similar or identical heater.

The pad projections 742*a*-*n* may comprise a metal material (e.g., stainless steel, carbon steel, aluminum, or the like) a rubber material, a plastic material, or the like. The pad projections 743*a*-*n* may comprise a metal material (e.g., stainless steel, carbon steel, aluminum, or the like) a rubber material, a plastic material, or the like. The pad projections 742*a*-*n* and 743*a*-*n* may comprise a same material (e.g., pad projections 742*a*-*n* and 743*a*-*n* may both comprise stainless steel) or different materials (e.g., pad projections 742*a*-*n* may comprise stainless steel and pad projections 743*a*-*n* may comprise rubber).

As shown in at least FIGS. 7 and 8D, the nth first and second projection devices 742-*n* and 743-*n* may rotate (e.g., counter rotate in synchronized rates of rotation) around their respective longitudinal axes and in synchronization with each other as the nth folded strip 728-*n* is fed in the nth local feed direction 747-*n* in proximity to the nth first and second projection devices 742-*n* and 743-*n*. The rate of movement of the nth folded strip 728-*n* in the nth local feed direction 747-*n* may be synchronized with the rates of rotation of the nth first and second projection devices 742-*n* and 743-*n* around their respective longitudinal axes. The first and second projection devices 742-*n* and 743-*n* may be configured to rotate in synchronization and in opposite rotational directions, so that opposing pad projections 742*a*-*n* and 743*a*-*n* of the nth first and second projection devices 742-*n* and 743-*n* rotate into closest proximity with each other and with the nth folded strip 728-*n* (such that clearance between proximate pad projections 742*a*-*n* and 743*a*-*n* reaches a minimum) after a particular (e.g., fixed, constant, and/or predetermined) length of the nth folded strip 728-*n* has moved in the nth local feed direction 747-*n* past the nth first and second projection devices 742-*n* and 743-*n*.

Still referring to FIGS. 7 and 8D, as the nth first and second projection devices 742-*n* and 743-*n* rotate respective pad projections 742*a*-*n* and 743*a*-*n* thereof to a position of closest proximity to each other and to the nth folded strip 728-*n*, the proximate pad projections 742*a*-*n* and 743*a*-*n* may contact and press into opposite outer surfaces of the folded strip 728-*n* to cause opposing inner surfaces 739 of the open enclosure 734 of the nth folded strip 728-*n* to be joined (e.g., pressed together) and sealed to each other to form an end seal 748 (e.g., end seal 748-2), that extends across a width of the nth folded strip 728-*n* in a direction that is different from (e.g., perpendicular to) the nth local feed direction 747-*n*, thereby partitioning (e.g., isolating) a feed direction-leading portion (e.g., distal portion 734-1) of the open enclosure 734 of the nth folded strip 728-*n* from a remainder, proximate portion 734-2 (e.g., proximate portion) of the open enclosure 734 of the nth folded strip 728-*n*. The nth first projection device 742-*n* may include a heater configured to heat the pad projections 742*a*-*n* (e.g., to about 300 F) so that, when proximate pad projections 742*a*-*n* and 743*a*-*n* press opposing inner surfaces 739 of the open enclosure 734 together, the heated pad projections 742*a*-*n* may cause the pressed-together inner surfaces 739 of the open enclosure 734 to adhere to each other to form the end seal 748.

When the nth local feed direction 747-*n* of a given nth folded strip 728-*n* at the sealing device 740 is vertically downwards, the feed direction leading portion (e.g., distal portion 734-1) of the open enclosure 734 is a bottom portion of the open enclosure 734 that is below the nth first and second projection devices 742-*n* and 743-*n* when respective pad projections 742*a*-*n* and 743*a*-*n* thereof are rotated into closest proximity to each other and the nth folded strip 728-*n* and the remainder, proximate portion 734-2 of the open enclosure 734 is an upper portion of the open enclosure 734 that is above the sealing device 740 when the respective pad projections 742*a*-*n* and 743*a*-*n* are rotated into closest proximity to each other and to the nth folded strip 728-*n*. Prior to respective pad projections 742*a*-*n* and 743*a*-*n* being rotated into closest proximity to each other and to the nth folded strip 728-*n*, the end seal 748-2 shown in FIG. 8D may be absent such that the distal and proximate portions 734-1 and 734-2 are separate, continuous portions of a single open enclosure 734 that are not partitioned or sealed from each other. As shown, the distal portion 734-1 of the open enclosure 734 may be adjacent to, and at least partially defined by, the end seal 748-1 that defines distal end 734*b*-1 of the open enclosure 734 prior to end seal 748-2 being formed. In some example embodiments, when opposing pad projections 742*a*-*n* and 743*a*-*n* are at closest proximity to each other and to the nth folded strip 728-*n*, the pad projections 742*a*-*n* and 743*a*-*n* may form an end seal 748-2 that partitions the distal portion 734-1 (e.g., bottom portion) of the open enclosure 734 (that contains an index 752 of granular material from the remainder, proximate portion 734-2 (e.g., upper portion) of the open enclosure 734.

As a result, the open enclosure 734 of the nth folded strip 728-*n* may be partitioned, at end seal 748-2, by the sealing device 740 into separate sealed enclosures 750, isolated (e.g., partitioned) from each other in the nth local feed direction 747-*n* by respective end seals 748. For example, distal portion 734-1 and proximate portion 734-2 may be partitioned from each other by end seal 748-2 as shown in FIG. 8D so that distal portion 734-1 is partitioned to form sealed enclosure 750-2 and end seal 748-2 defines a new distal end 734-*b*2 of the open enclosure 734 that may be empty or substantially empty of granular material.

Each separate sealed enclosure 750 includes (e.g., contains, holds, etc.) a separate, particular amount (e.g., index 752) of granular material and is closed at opposite ends in the nth local feed direction 747-*n* by separate end seals (e.g., sealed enclosure 750-2 is closed at opposite ends by end seals 748-1 and 748-2). The sealed enclosures 750 may have a same or substantially same length in the nth local feed direction 747-*n*. As a result, each separate sealed enclosure 750 that is formed by the sealing device 740 may contain same or substantially same amounts of granular material (e.g., same-sized indexes 752).

The rate of movement of the nth folded strip 728-*n* in the nth local feed direction 747-*n* and the rates of rotation of the nth first and second projection devices 742-*n* and 743-*n* may be synchronized with the intervals and/or durations of index operations performed by the nth doser mechanism 702-*n* so that the nth doser mechanism 702-*n* begins an index operation to supply a single index 752 of granular material into the distal portion 734-1 of the open enclosure 734 after the nth first and second projection devices 742-*n* and 743-*n* have formed a first end seal 748-1 to partition (e.g., seal) a previously-supplied index 752 into a first sealed enclosure 750-1. Thus, the single index 752 is supplied into an empty distal portion 734-1 of the open enclosure 734 having an open proximate end 734*a* and a distal end 734*b*-1 closed by the first end seal 748-1. The nth doser mechanism 702-*n* ends the index operation prior to the particular length of the folded strip 728-*n* being moved past the nth first and second projection devices 742-*n* and 743-*n*. The nth first and second projection devices 742-*n* and 743-*n* may form a next end seal 748-2, above the fill line of the single index 752 in the distal portion 734-1, to seal the single index 752 into a next sealed enclosure 750-2 and to establish a new, closed distal end 734*b*-2 of the open enclosure 734 that is closed by next end seal 748-2 and is devoid or substantially devoid of granular material.

In some example embodiments, the first to nth second projection devices 743-1 to 743-*n* may be absent from the packaging machine 700.

Referring now to FIG. 7 and FIG. 8E, the packaging machine 700 may include a cutting device 760 that is configured to separate sealed enclosures 750 of each given folded strip 728-1 to 728-*n* of packaging material into separate packages 770 (also referred to herein as articles of packaging) that each contain a separate index 752 of granular material, where each index 752 may be a same or substantially same amount of granular material.

As shown, the cutting device 760 may include a plurality of blades 762-1 to 762-*n*, also referred to herein as "blades", connected via a central rod 764. The central rod 764 may be mechanically connected to a drive motor 766 (e.g., a servomotor) and thus may be configured to rotate around its longitudinal axis based on operation of the drive motor 766 to further cause the blades 762-1 to 762-n to rotate around the longitudinal axis of the central rod 764.

Each separate blade 762-1 to 762-n may be aligned (e.g., vertically and/or horizontally overlapped) with a separate nth process stream of the packaging machine 700 and thus only the portions of the cutting device 760 with regard to the nth process stream are described, but it will be understood that elements of the cutting device 760 with regard to the 1 to (n−1)th process streams may be identical or substantially identical to elements of the cutting device 760 described with regard to the nth process stream.

As shown in at least FIG. 8E, the nth blade 762-n may be arranged to be aligned with (e.g., horizontally overlap with) the nth folded strip 728-n that defines at least one sealed enclosure 750 containing a particular amount (e.g., index 752) of granular material. The cutting device 760 may be located vertically below the sealing device 740 of the nth process stream so that the nth folded strip 728-n moves in an nth local feed direction 767-n (e.g., downwards) from the nth first and second projection devices 742-n and 743-n towards the nth blade 762-n of the cutting device 760.

As shown in at least FIGS. 7 and 8E, the nth blade 762-n may rotate around the longitudinal axis of the central rod 764 as the nth folded strip 728-n is fed in the nth local feed direction 767-n (e.g., downwards) in proximity to the nth blade 762-n. The rate of movement of the nth folded strip 728-n in the nth local feed direction 767-n may be synchronized with the rate of rotation of the nth blade 762-n around the central rod 764 so that the nth blade 762-n rotates into closest proximity with the nth folded strip 728-n after a particular (e.g., fixed, constant, and/or predetermined) length of the strip 728-n, which may be the length of each sealed enclosure 750 between opposite adjacent end seals 748, has moved in the nth local feed direction 767-n past the cutting device 760. As a result, the packaging machine 700 may be configured to move the nth folded strip 728-n and further rotate the nth blade 762-n in synchronization with such movement such that, when the nth blade 762-n rotates into closest proximity with the nth folded strip 728-n, the nth blade 762-n contacts and cuts through (e.g., bisects) an end seal 748 of the nth folded strip 728-n in the direction in which the seal 748 extends (e.g., perpendicular to the nth local feed direction 767-n). The aforementioned rotation and movements may be synchronized so that the nth blade 762-n cuts through the centerline (or approximately the centerline) of each end seal 748 extending in the direction perpendicular to the nth local feed direction 767-n to exactly or substantially exactly (e.g., ±10%) cut the end seal 748 in half in the direction perpendicular to the nth local feed direction 767-n. The rotation of the nth blade 762-n may be further synchronized with movement of the nth folded strip 728-n so that each sequential end seal 748 of the nth folded strip 728-n is contacted by the nth blade 762-n, and the nth blade 762-n only contacts end seals 748 of the nth folded strip 728-n when the nth blade 762-n is at a closest proximity to the nth folded strip 728-n, as the nth blade 762-n and strip 728-n move in synchronization with each other. For example, the movement of a given strip 728-n in the nth local feed direction 767-n may be synchronized with the rotation of a corresponding nth blade 762-n around the central rod 764 so the distal edge 765 of the nth blade 762-n rotates into contact with a seal 748 of the nth folded strip 728-n after each rotation of the nth blade 762-n around the central rod 764 and a length of a single sealed enclosure 750 between adjacent seals end 748 of the strip 728-n has moved past the cutting device 760 in the nth local feed direction 767-n during a single rotation of the nth blade 762-n around the central rod 764.

Still referring to FIGS. 7 and 8E, as the nth blade 762-n rotates to a position of closest proximity to the nth folded strip 728-n, the nth blade 762-n (e.g., distal edge 765 thereof) may contact and cut through the proximate end seal 748 of the nth folded strip 728-n to cause a feed direction-leading sealed enclosure 750 of the nth folded strip 728-n to be separated from a remainder of the nth folded strip 728-n as a discrete article of packaging, which is interchangeably referred to herein as a package 770 that includes a discrete (e.g., particular) amount (e.g., index 752) of granular material.

For example, when the nth local feed direction 767-n of a given nth folded strip 728-n at the cutting device 760 is vertically downwards, the feed direction leading sealed enclosure 750 is a bottom sealed enclosure 750 of the nth folded strip 728-n that is below the distal edge 765 of the nth blade 762-n when the nth blade 762-n is at closest proximity to the nth folded strip 728-n and the remainder portion of the nth folded strip 728-n is above the distal edge 765 of the nth blade 762-n when the nth blade 762-n is at closest proximity to the nth folded strip 728-n. In such example embodiments, when the nth blade 762-n is at closest proximity to the nth folded strip 728-n, the nth blade 762-n may cut through (e.g., bisect) an end seal 748 that joins the bottom sealed enclosure 750 to a remainder of the nth-folded strip 728-n into two physically separate sealed portions, thereby separating the bottom sealed enclosure 750, as a package 770, from the remainder of the nth folded strip 728-n.

As a result, the sealed enclosures 750 of the nth folded strip 728-n may be cut by the cutting device 760 into separate packages 770 (e.g., separate articles of packaging) containing separate, respective indexes 752 of granular material, where the separate packages 770 have a same or substantially same length between opposite end seals 748 at opposite longitudinal ends thereof. As a result, each separate package 770 may contain same or substantially same amounts (e.g., indexes 752) of granular material.

FIG. 8E shows a single nth blade 762-n horizontally aligned with the nth process stream and rotating around the central rod 764, but example embodiments are not limited thereto. For example, similarly to the nth projection device 742-n shown in FIG. 8D, the cutting device 760 may include multiple nth blades 762-n extending radially from the central rod 764 and spaced apart (e.g., equally apart) from each other, and the nth blades 762-n may be rotated around central rod 764 to cut separate end seals 748 as the nth folded strip 728-n is fed to the cutting device 760 in the nth local feed direction 767-n.

Still referring to FIGS. 7 and 8E, each newly-established (e.g., newly-formed) package 770, having been separated from the rest of the nth folded strip 728-n by the cutting device 760, may fall to a conveyor 780 or a collection area/bin. In FIGS. 7 and 8E, where the packaging machine 700 includes a conveyor 780, packages 770 established by the cutting device 760 may fall onto an upper surface of the conveyor 780. As shown, the conveyor 780 may have a driven shaft 784 that is driven by a drive motor 786 (e.g., a servomotor) to rotate 782 to cause the conveyor 780 to move packages 770 thereon towards a collection area 788, which may be a collection bin.

Accordingly, packages 770 containing respective indexes 752 of granular material may be formed by the packaging machine 700 in "n" process streams that each include a doser mechanism 100 according to any of the example embodiments, where the packages 770 may be formed with improved precision, accuracy, and consistency of the amount of granular material supplied from each doser mechanism 100 to form each separate index 752 in each separate package 770. As a result, a packaging machine 700 that includes said one or more doser mechanisms 100 may be configured to reduce waste, improve the precision, accuracy, and consistency of the amounts of granular material included in each package 770, and/or reduce the risk of excess granular material draining from the one or more doser mechanisms 100 to contaminate and/or degrade operation of other portions of the packaging machine 700.

Referring back to FIG. 7, the packaging machine 700 may include a control device 790 that is configured to control some or all of the packaging machine 700. As shown in FIG. 7, the control device 790 may be communicatively coupled to the drive motors 716, 124, 746, 766, 786 that may be separate servomotors and may cause various portions of the packaging machine 700 to operate. The control device 790 may control some or all of the drive motors of the packaging machine 700 to cause the packaging machine 700 to operate in order to form packages 770 each containing a particular amount (e.g., index 752) of granular material.

In some example embodiments, the control device 790 is configured to control the various drive motors of the packaging machine 700 to cause the sheet and strips 726-1 to 726-n, 728-1 to 728-n of packaging material to be fed through the packaging machine 700 at a particular rate of movement, and for the rotation of the projection devices 742-1 to 742-n and 743-1 to 743-n of the sealing device 740 and the blades 762-1 to 762-n of the cutting device 760 and the intervals of the index operations of the doser mechanisms 702-1 to 702-n to be synchronized with the rate of motion of the sheet and/or strips 726-1 to 726-n, 728-1 to 728-n of packaging material through the packaging machine 700.

The control device 790 may control the doser mechanisms 702-1 to 702-n to perform index operations at a particular interval that is synchronized with movement of the packaging material and with operation of the sealing device 740 so that each index operation supplies an index 752 of granular material into an open enclosure 734 that has been newly formed due to the sealing device 740 forming a new end seal 748 in in the folded strip 728-n that seals a previous distal portion 734-1 containing a previously-supplied index 752 into a separate sealed enclosure 750 and establishes a new, empty distal portion 734-1 of the open enclosure 734. The control device 790 may be configured to adjust the interval between index operations, the duration of each index operation, the rate of rotation of the one or more augers 122 of any of the doser mechanisms 702-1 to 702-n during the index operation, or the like in order to control the amount of granular material in each index 752 and to control the time spacing between the supplying of each index 752. The control device 790 may be configured to account for differing flow rates of different granular materials out of the doser mechanisms 702-1 to 702-n.

The control device 790 may store a look-up table, which may be empirically established, which associates different index 752 amounts of various types of granular material with corresponding operational parameters of the packaging machine 700, including corresponding drive motor 124 index rotation rates, index durations, index time spacings (e.g., duration between time-adjacent indexes), rate of movement of the sheet/strips of packaging material, rate of rotation of the projections 742/743 and/or blades 762, some combination thereof or the like. Operations of drive motors may be represented based on timings, amounts, and/or rates of electrical power to be applied (e.g., supplied) to said drive motors. Based on a determined amount of a determined type of granular material to be included in each index 752 (which may be provided to the control device 790 via a communication interface, user interface such as a touchscreen and/or keyboard interface, or the like), the control device 790 may access the look-up table, determine the corresponding operational parameters associated with the determined index amount and type of granular material and control one or more portions of the packaging machine 700, including for example the drive motor 124 of each doser mechanism 702-1 to 702-n but also or alternatively including some or all of the drive motors of the packaging machine 700, to ensure that the packaging machine creates packages 770 each containing a constant or substantially constant (e.g., ±10%) amount (e.g., index 752) of granular material across a range of granular materials and/or desired index 752 amounts.

In some example embodiments, some or all of any of the control device 790 may include, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. As shown in FIG. 7, the control device 790 may include some or all of a processor 792 (e.g., a CPU), a memory 794 (e.g., a solid state drive, or SSD), and a communication interface 796 that are communicatively coupled together via a bus connection 798. It will be understood that any type of non-transitory computer readable storage device may be used as the memory 794 in addition or alternative to an SSD. In some example embodiments, the processing circuitry may include a non-transitory computer readable storage device, or memory (e.g., memory 794), for example a solid state drive (SSD), storing a program of instructions, and a processor (e.g., processor 792) that is communicatively coupled to the non-transitory computer readable storage device (e.g., via a bus connection 798) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, etc.) that is described as "implementing" an element (e.g., packaging machine 700) will be understood to implement the functionality of said implemented element (e.g., the functionality of the packaging machine 700).

In FIGS. 7 and 8A-8E, the packaging machine 700 is shown to include multiple separate drive motors 716, 124, 746, 766, 786 coupled to separate, respective portions of devices of the packaging machine 700. However, example embodiments are not limited thereto. In some example embodiments, some or all portions of the packaging machine 700 may be driven by a single, same drive motor (e.g., drive motor 124) that is controlled by the control device 790. In some example embodiments, the packaging machine 700 includes a single drive motor 124 that is mechanically coupled (e.g., via one or more drive transmission mechanisms, including one or more drive belts, meshed gear set, or the like) to each of the packaging supply device 710, doser mechanisms 702-1 to 702-*n*, sealing device 740, cutting device 760, and conveyor 780 and is configured to drive each of said devices under control of the control device 790 and also such that the operation of said devices (and movements of elements thereof) are at least partially synchronized with respect to each other to enable the movement synchronization of various elements as described herein.

In some example embodiments, one or more of the described devices of the packaging machine 700 may be absent. For example, in some example embodiments the packaging machine 700 may move pre-formed open packages of packaging material, defining respective open enclosures 734, into alignment with separate, respective doser mechanisms 702-1 to 702-*n* to be filled with granular material by the doser mechanisms 702-1 to 702-*n*, and the packaging machine 700 may include a sealing device 740 that seals the open enclosures 734 of said open packages to form packages 770 containing respective indexes 752 of granular material supplied into the open enclosures 734 from one or more of the doser mechanisms 702-1 to 702-*n*. The doser mechanisms 702-1 to 702-*n* may each be controlled (e.g., based on controlling operation of the respective auger conveyors 120 via control of the drive motor(s) 124) to initiate supplying granular material out of the respective second openings 180-2 for a particular period of time in response to an open package being moved to be vertically underneath the given doser mechanism and/or to not supply granular material when an open packet is not vertically underneath the given doser mechanism, such that the doser mechanisms 702-1 to 702-*n* may each supply a particular amount (e.g., index 752) of granular material into separate open packages. In some example embodiments, the cutting device 760, folding devices 730-1 to 730-*n*, and at least a portion of the packaging supply device 710 may be absent from the packaging machine 700.

Figure 9:
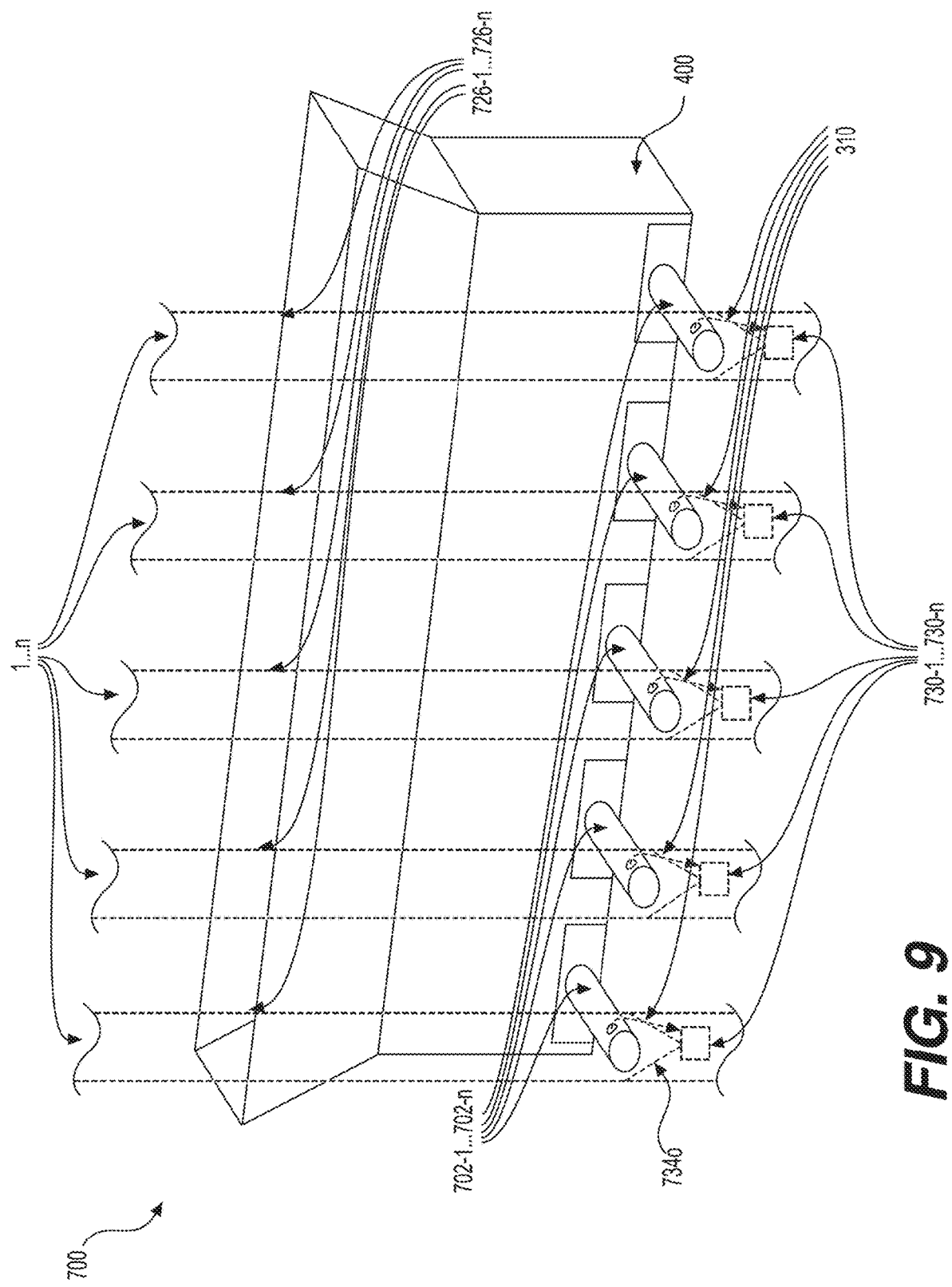
FIG. 9 is a perspective view of region C of the packaging machine of FIG. 7, according to some example embodiments.

FIG. 9 is a perspective view of region C of the packaging machine 700 of FIG. 7, according to some example embodiments.

In some example embodiments, and as shown in FIG. 9, "n" may be greater than 1 (e.g., in FIG. 9 may equal 5), and the packaging machine 700 may include a plurality of doser mechanisms 702-1 to 702-*n*, each separate doser mechanism configured to be aligned with a separate folded strip 728-1 to 728-*n* of packaging material and a separate folding device 730-1 to 730-*n* that is configured to fold the respective aligned strip 726 of packaging material to form a separate open enclosure 734 that is vertically aligned with the respective doser mechanism 702-1 to 702-*n*.

Accordingly, and as shown in FIG. 9 in relation to FIGS. 7 and 8A-8E, the plurality of doser mechanisms 702-1 to 702-*n* may be configured to supply separate, respective amounts (e.g., indexes 752) of the supplied granular material 310 in parallel, "n" process streams, and the packaging supply device 710 may be configured to supply a plurality of articles of packaging (e.g., strips 726-1 to 726-*n*) in parallel to the plurality of doser mechanisms 702-1 to 702-*n* to be folded into a plurality of separate folded strips 728-1 to 728-*n* that define separate, respective open enclosures 734 that may be filled in parallel with supplied granular material 310 from separate, respective doser mechanisms 702-1 to 702-*n*.

Figure 10:
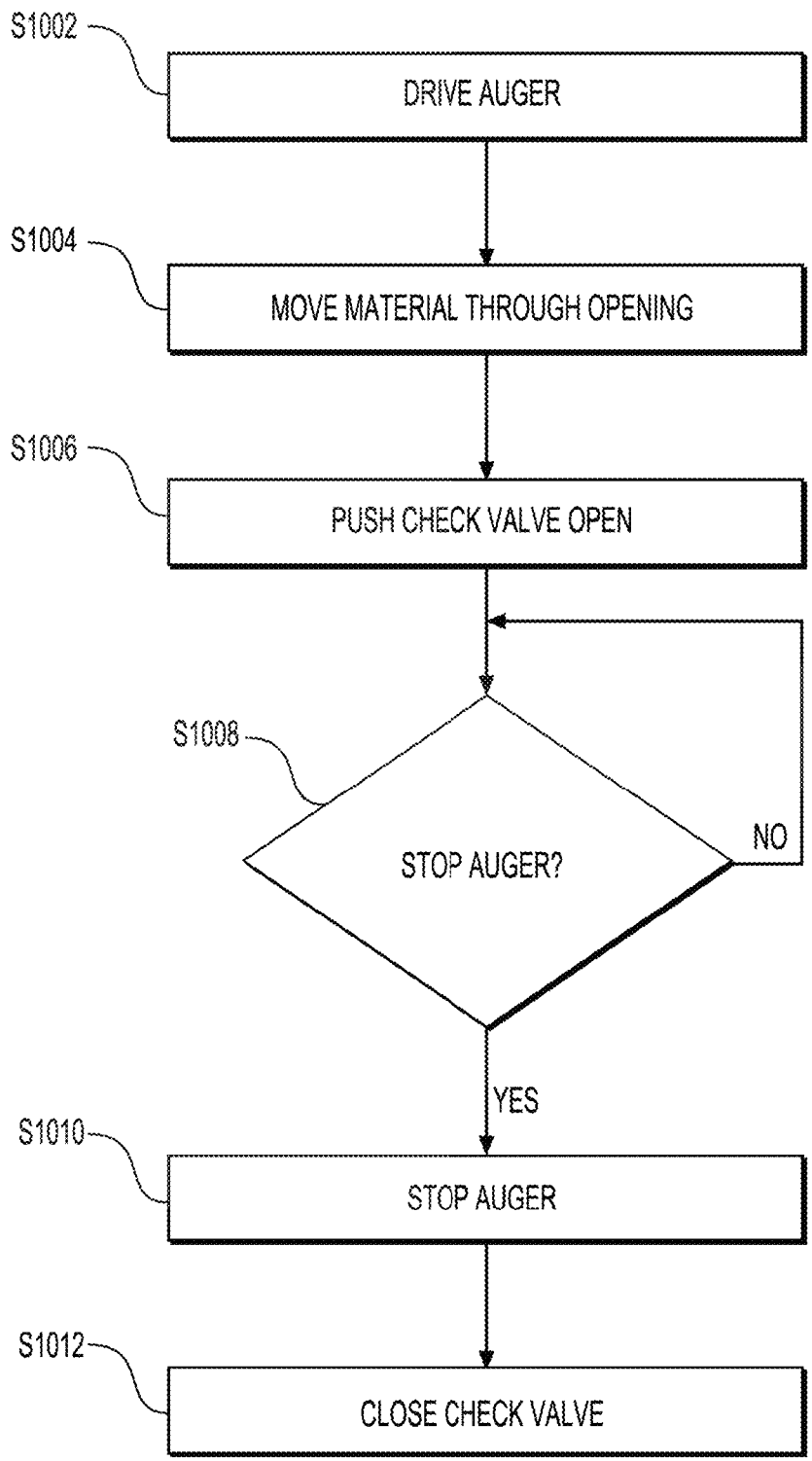
FIG. 10 is a flowchart illustrating a method of operating a doser mechanism, according to some example embodiments.

FIG. 10 is a flowchart illustrating a method of operating a doser mechanism to implement a single index operation, according to some example embodiments. The method shown in FIG. 10 may be implemented with regard to any of the doser mechanisms according to any of the example embodiments, including for example a control device configured to control one or more portions of the doser mechanisms (e.g., control device 790). It will be understood that operations of the method shown in FIG. 10 may be performed in a different order than shown in FIG. 10. It will further be understood that some operations shown in FIG. 10 may be omitted from the method in some example embodiments and/or some additional operations not shown in FIG. 11 may be added to the method.

At S1002, the auger conveyor of the doser mechanism (e.g., auger conveyor 120) is controlled (e.g., based on controlling the operation of a drive motor 124 thereof) to be caused to be driven, for example to "operate" and/or to be in an "on" operating state, to cause the one or more augers of the auger conveyor (e.g., one or more augers 122) to rotate to move granular material (e.g., out of a reservoir 400). At S1004, the auger conveyor moves the granular material, based on the driven rotation of the one or more augers thereof, into an internal enclosure (e.g., enclosure 102*e*) of the doser mechanism through a first opening (e.g., first opening 180-1) at a first end (e.g., 102-1) of the doser mechanism and further moves the granular material through the enclosure towards a second opening (e.g., second opening 180-2) that is closer to an opposite end of the doser mechanism than the first opening is to the opposite end.

At S1006, the auger conveyor is controlled (e.g., based on controlling the operation of a drive motor 124 thereof) to cause the one or more augers to rotate to cause granular material (e.g., 308) to be moved through the internal enclosure from the first end of the doser mechanism (e.g., 102-2) toward the second end (e.g., 102-2) of the doser mechanism along a central longitudinal axis (e.g., 199) of the doser mechanism. At S1006, the rotating one or more augers further move the granular material out of the internal enclosure through the second opening (e.g., 180-2) to exert (e.g., apply) force or pressure (e.g., force 380) on a check valve member (e.g., 132) that covers the second opening in a rest position (e.g., rest position 306-1). The granular material is moved by the auger conveyor through the second opening so that the granular material is caused (e.g., based on increasing the pressure of granular material 308 in the enclosure 102*e* proximate or adjacent to the second opening 180-2) to exert the force or pressure (e.g., force 380) on the check valve member (e.g., 132) to cause the check valve member to move (e.g., push the check valve member) from a rest position (e.g., 306-1) to an open position (e.g., 306-2) to at least partially expose the second opening to an exterior of the doser mechanism, thereby enabling the granular material to move (e.g., flow) through the second opening and out of the doser mechanism (e.g., exit the doser mechanism through the second opening 180-2 as supplied granular material 310).

At S1008 a determination is made regarding whether to stop operation of the auger conveyor so that the one or more augers of the auger conveyor is in an "off" operating state and is no longer moving and thus is not moving granular material. If not (S1008=NO), the method continues. If so, (S1008=YES), at S1010, the auger conveyor is controlled to be stopped (e.g., switch from the "on" operating state to the "off" operating state) such that the one or more augers are caused to stop rotating (e.g., based on causing the drive motor 124 to stop rotating).

In some example embodiments, the auger conveyor is determined to stop operation at S1008 based on a determination of whether the auger conveyor has been in the "on" state (e.g., that the drive motor 124 has been rotating the driveshaft thereof) for at least a particular (e.g., threshold) period of time. For example, an operation timer for auger conveyor operation may be initialized and/or reset to t=0 seconds at S1002 when the auger conveyor is caused to be switched to the "on" operating state at S1002. The auger conveyor may be associated with a threshold operating time (e.g., t=1.2 seconds), which may be stored at a control device controlling the auger conveyor 120 (e.g., in a memory 794 of control device 790). The control device may determine at S1008 whether the elapsed time "t" since performance of S1002 equals or exceeds the threshold operating time (e.g., whether t≥1.2). If not, S1008=NO. If so, S1008=YES and the method proceeds to S1010 where the auger conveyor is caused to stop.

As described herein, the control device 790 may determine a particular duration of an index operation and/or a rate of rotation of the one or more augers (e.g., based on the operation of the drive motor 124) based on a determined (e.g., desired, commanded, etc.) granular material type and/or granular material index amount. The control device 790 may access a database (e.g., empirically-generated look-up table) to determine the particular duration (e.g., threshold operating time) of an index operation (e.g., duration of rotation of the drive motor 124, which may be represented by a duration that electrical power is controlled to be supplied to the drive motor), amount and/or rate of electrical power supplied to the drive motor 124, and/or a rate of rotation of the driveshaft of the drive motor 124 during the index operation (which may be represented by amount and/or rate of power applied to drive motor 124) that is associated with the determined (e.g., desired, commanded, etc.) granular material type and/or granular material index amount and may control the drive motor 124 at S1002-S1008 to operate at the determined rate and for the determined duration (e.g., supply the determined amount and/or rate of power for the determined duration), to cause the one or more augers to rotate at a particular corresponding rate for the determined duration, to cause the doser mechanism 100 to supply a particular amount of an index (e.g., 752) of granular material. The aforementioned look-up table may be empirically generated using a doser mechanism 100 that includes the same type of check valve 130 as the doser mechanism 100 being controlled by the control device 790 to perform the index operation, such that the index duration (e.g., drive motor operation duration) and drive motor rate of rotation (e.g., amount and/or rate of supplied electrical power, driveshaft rate of rotation, etc.) stored in the look-up table correspond accurately to the corresponding index amount and type of the granular material.

At S1012, due to the auger conveyor stopping, the movement of granular material to and through the second opening may be stopped or reduced, and the force or pressure exerted on the check valve member by the granular material through the second opening ceases or is reduced. As a result of the ceasing or reduction of such exerted force or pressure, the check valve member moves (e.g., relaxes) from the open position to the rest position to at least partially cover (e.g., obstruct) the second opening to partially or completely retain the granular material still in the internal enclosure and/or second opening (e.g., based on creating a back pressure on the granular material still in the internal enclosure and/or second opening) and thus to at least partially restrict or prevent movement (e.g., drainage) of granular material out of the internal enclosure through the second opening and thus out of the doser mechanism while the auger conveyor is stopped.

As described herein, the check valve (e.g., check valve 130) may be "open" when the valve member (e.g., valve member 132) thereof is in an open position (e.g., open position 306-2), and the check valve may be in "closed" when the valve member (e.g., valve member 132) thereof is in a rest position (e.g., rest position 306-1).

It will be understood that controlling the auger conveyor (e.g., starting and/or stopping the auger conveyor) may be implemented based on controlling a supply of electrical power to a drive motor (e.g., 124) to transmit power to the auger of the auger conveyor and/or controlling a drive transmission to control the transmission of power from a drive motor to the one or more augers. Such control may be implemented by a control device (e.g., 790) which may implement such control based on controlling (e.g., adjusting, initializing, inhibiting, etc.) the supply of electrical power to one or more drive motors and/or actuators associated with one or more drive transmissions.

Figure 11:
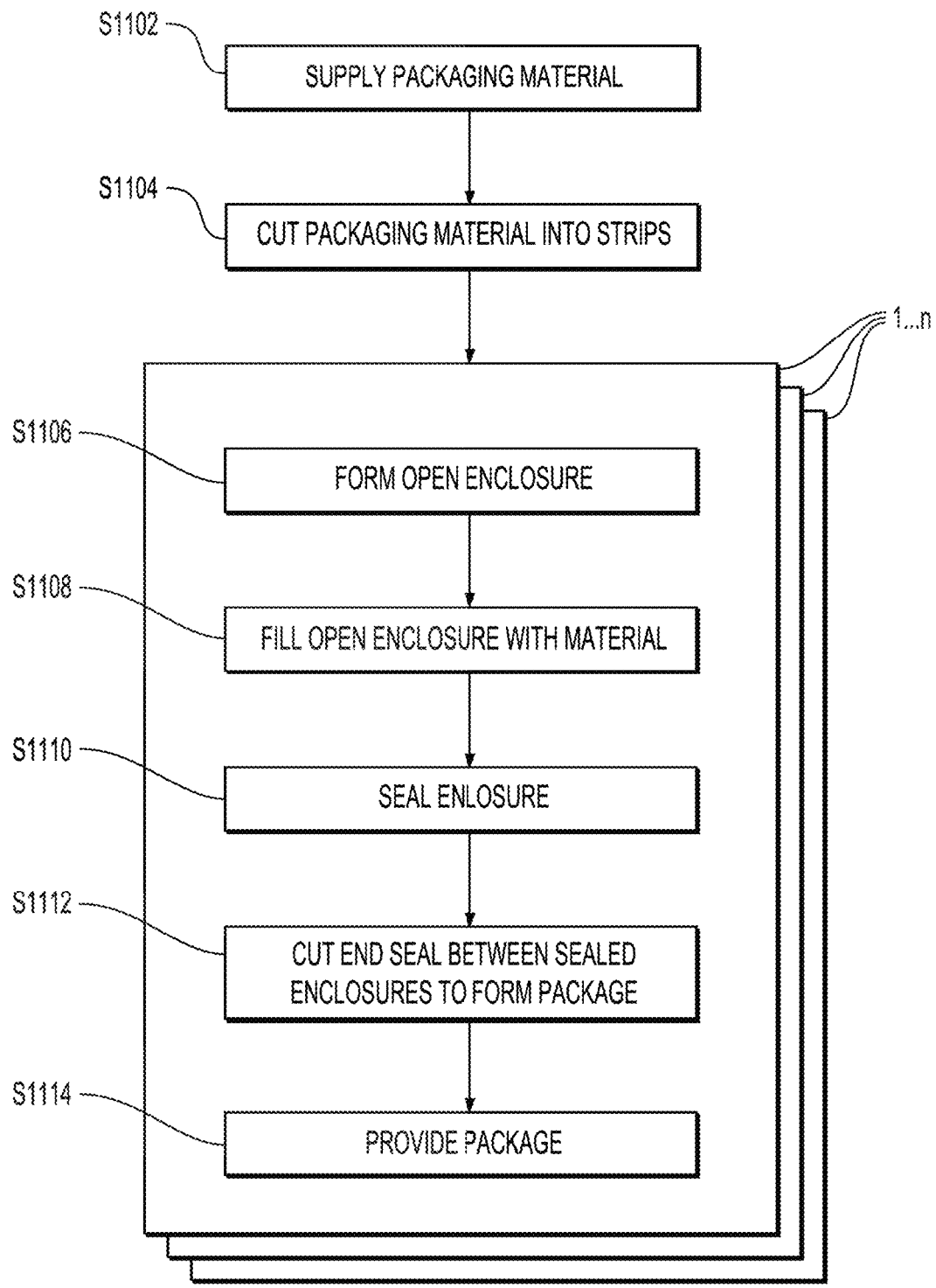
FIG. 11 is a flowchart illustrating a method of operating a packaging machine that includes a doser mechanism, according to some example embodiments.

FIG. 11 is a flowchart illustrating a method of operating a packaging machine that includes one or more doser mechanisms, according to some example embodiments. The method shown in FIG. 11 may be implemented with regard to any of the packaging machines according to any of the example embodiments (e.g., implemented by a control device controlling the packaging machine and/or doser mechanism). The method shown in FIG. 11 may be implemented with regard to any of the packaging machines according to any of the example embodiments, including for example a control device configured to control one or more portions of the packaging machines (e.g., control device 790). It will be understood that operations of the method shown in FIG. 11 may be performed in a different order than shown in FIG. 11. It will further be understood that some operations shown in FIG. 11 may be omitted from the method in some example embodiments and/or some additional operations not shown in FIG. 11 may be added to the method.

At S1102, a packaging supply device of the packaging machine (e.g., packaging supply device 710) is operated (e.g., based on controlling a drive motor and/or drive transmission) to supply a sheet of packaging material (e.g., from a roll of packaging material).

At S1104, the sheet of packaging material is supplied into contact with an array of cutting devices (e.g., blades 722-1 to 722-(n−1)) which may divide the sheet of packaging material into a plurality of separate strips of packaging material (e.g., strips 726-1 to 726-n).

At S1106-S1114, each separate strip of packaging material may be directed to be fed through a separate process stream of "n" process streams of the packaging machine 700. Step S1104 may be absent when the packaging machine 700 includes a single process stream. Steps S1106-S1114 may be each described with reference to an nth process stream, but it will be understood that steps S1106-S1114 may be performed at least partially in parallel in the 1 to nth process streams.

At S1106, each separate strip of packaging material may be folded, for example by a separate folding device (e.g., 730-n), into a separate folded strip (e.g., 728-n) defining an open enclosure (e.g., 734) having an opening (e.g., 734o) at a proximate end (e.g., 734a) and an end seal (e.g., 748) at a distal end (e.g., 734b). The strip may be fed to the folding device (e.g., 730-n) so that the nth folded strip defines an open enclosure that is enclosed perpendicularly to the local feed direction of the strip and is open at a top end that faces upwards as the folded strip is continued to be fed in the given process stream and is closed (e.g., by an end seal 748) at a bottom end.

At S1108, each separate doser mechanism of the packaging machine (e.g., 702-*n*) may supply a particular amount (e.g., index 752) of granular material into a separate open enclosure (e.g., 734) defined by a separate folded strip of packaging material (e.g., 728-*n*) through the open end thereof to at least partially fill the distal end of the open enclosure of the folded strip (e.g., fill at least a distal portion of the open enclosure that is adjacent to the end seal (e.g., 748) that closes the distal end of the open enclosure) with at least a particular amount (e.g., index 752) of granular material. As shown in FIGS. 7 and 8C, each doser mechanism of each respective process stream may be at least partially vertically aligned (e.g., at least partially vertically overlapped) with the open top end of a separate open enclosure of a separate folded strip of packaging material. Each doser mechanism may be controlled to implement an index operation that supplies a flow of granular material (e.g., supplied granular material 310) at a particular rate, for a particular duration, before stopping the flow, to cause the particular amount (e.g., index 752) of granular material to be supplied into the open enclosure. Such control may be implemented based on controlling a duration, applied power, and/or rate of rotation of a drive motor (e.g., servomotor) of the doser mechanism.

At S1110, a folded strip having an open enclosure at least partially filled (e.g., at least the distal portion 734-1 is filled) with an index (e.g., 752) of granular material supplied from a doser mechanism is fed in a local feed direction (e.g., downwards) to a sealing device (e.g., sealing device 740) that seals at least the filled portion (e.g., distal portion 734-1) of the open enclosure to partition the distal portions (e.g., 734-1) of the open enclosure, and the index of granular material contained therein, into a separate sealed enclosure (e.g., 750), also referred to as a sealed article of packaging, sealed pouch, sealed package, sealed packet, or the like, that is defined to extend between adjacent and opposite end seals in the folded strip and contains a particular amount of granular material therein (e.g., index 752), the sealed enclosure being partitioned in the nth local feed direction by an end seal (e.g., 748) formed by sealing opposing inner surfaces of the open enclosure. The packaging machine 700 may be configured to partition the folded strips 728-1 to 728-*n* into sealed enclosures 750 that each contain an index 752 of granular material that is a same or substantially same amount (e.g., dose) of granular material. The operation of the sealing device may be synchronized with the operation of a doser mechanism so that the sealing device forms an end seal to seal a given distal portion of the open enclosure, and index contained therein, after the completion of an index operation by the doser mechanism and prior to the starting of a next index operation (e.g., the doser mechanism is in an "off" operating state and is not presently supplying granular material). As a result, the operation of the sealing device, by sealing a given distal portion of the open enclosure and contained index from a proximate portion of the open enclosure, forms a new end seal that establishes a new distal end and distal portion of the open enclosure that is devoid (e.g., empty) or substantially devoid of granular material prior to the start of a new index operation by the doser mechanism to at least partially fill the new distal portion of the open enclosure with a new index of granular material. As a result, such synchronization may improve the accuracy and precision of the amount of each index of granular material in each sealed enclosure and may further reduce or prevent granular material from being trapped in a formed end seal.

At S1112, each nth folded strip having isolated (e.g., partitioned) sealed enclosures separated by end seals is fed in an nth local feed direction (e.g., downwards) from the sealing device to a cutting device (e.g., cutting device 760) that cuts through each separate end seal of the nth folded strip to separate distal (e.g., bottom) sealed enclosures of the nth folded strip from a remainder of the nth folded strip to thus establish (e.g., form) packages (e.g., packages 770, also referred to herein as articles of packaging) that each contain a particular amount (e.g., index 752, dose, etc.) of granular material. At S1114, the packages are provided, or supplied, to a collection area or bin. The packages may be allowed to fall from the cutting device to a collection area or bin. The packages may be directed to a conveyor that transports the packages to a collection area or bin.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

I claim:

1. A doser mechanism, comprising:
a cylindrical shell defining an internal enclosure having a central longitudinal axis that extends between opposite first and second ends, the cylindrical shell further defining a first opening into the internal enclosure at the first end and a second opening into the internal enclosure proximate to the second end, the second opening having a central axis that is different from the central longitudinal axis;
an auger conveyor at least partially extending through the cylindrical shell; and
a check valve coupled to the cylindrical shell and having a valve member configured to selectively cover the second opening, the check valve configured to cause the valve member to move between a rest position that covers the second opening and an open position that exposes the second opening to an exterior of the doser mechanism in response to an applied force being applied to the valve member from the internal enclosure through the second opening,
wherein the check valve is configured to cause the valve member to move to the rest position based on a weight of the valve member being greater than the applied force applied to the valve member from the internal enclosure through the second opening, and
wherein the second opening is on an upper side of the cylindrical shell such that at least the central axis of the second opening extends at least partially in a direction that is opposite the direction of gravity, such that the valve member is at least partly biased to move to the rest position by gravity.

2. The doser mechanism of claim 1, wherein the valve member is a reed valve.

3. A doser mechanism, comprising:
a cylindrical shell defining an internal enclosure having a central longitudinal axis that extends between opposite first and second ends, the cylindrical shell further defining a first opening into the internal enclosure at the first end and a second opening into the internal enclosure proximate to the second end, the second opening having a central axis that is different from the central longitudinal axis;
an auger conveyor at least partially extending through the cylindrical shell; and
a check valve coupled to the cylindrical shell and having a valve member configured to selectively cover the second opening, the check valve configured to cause the valve member to move between a rest position that covers the second opening and an open position that exposes the second opening to an exterior of the doser mechanism in response to an applied force being applied to the valve member from the internal enclosure through the second opening,
wherein the valve member is a movable gate configured to rotate around a pin that is attached to the cylindrical shell.

4. A doser mechanism, comprising:
a cylindrical shell defining an internal enclosure having a central longitudinal axis that extends between opposite first and second ends, the cylindrical shell further defining a first opening into the internal enclosure at the first end and a second opening into the internal enclosure proximate to the second end, the second opening having a central axis that is different from the central longitudinal axis;
an auger conveyor at least partially extending through the cylindrical shell; and
a check valve coupled to the cylindrical shell and having a valve member configured to selectively cover the second opening, the check valve configured to cause the valve member to move between a rest position that covers the second opening and an open position that exposes the second opening to an exterior of the doser mechanism in response to an applied force being applied to the valve member from the internal enclosure through the second opening,
wherein the check valve includes a spring that applies a spring force to spring-load the valve member to the rest position, such that the check valve is configured to cause the valve member to move from the rest position to the open position in response to the applied force being applied to the valve member from the internal enclosure through the second opening, the applied force being greater than the spring force.

5. The doser mechanism of claim 1, wherein the valve member includes a cover plate having an inner cover surface configured to cover the second opening in response to the valve member being in the rest position.

6. The doser mechanism of claim 5, wherein the inner cover surface has a surface contour that is complementary to a surface contour of a portion of an outer surface of the cylindrical shell, such that the inner cover surface of the cover plate lies flush with the outer surface of the cylindrical shell in response to the valve member being in the rest position.

7. The doser mechanism of claim 1, further comprising:
a sheath structure overlapping the second opening and the check valve in a first vertical direction along a vertical axis that is perpendicular to the central longitudinal axis, the sheath structure further overlapping the second opening and the check valve in opposite horizontal directions that are orthogonal to the vertical axis,
wherein the second opening is configured to direct a material moving through the second opening to move at least partially in the first vertical direction, and
wherein the sheath structure is configured to cause the material moving through the second opening at least partially in the first vertical direction to be redirected to move in at least partially in a second vertical direction that is opposite to the first vertical direction.

8. The doser mechanism of claim 1, wherein the auger conveyor includes a twin-auger conveyor including two augers extending in parallel with each other through the internal enclosure, wherein the two augers are configured to rotate around respective longitudinal axes and in opposite rotational directions.

9. The doser mechanism of claim 8, wherein
the two augers are aligned along a horizontal axis that is perpendicular to the central longitudinal axis,
the central axis of the second opening is angled in relation to the horizontal axis by a first angle that is between about 45 degrees and about 90 degrees.

10. The doser mechanism of claim 9, wherein the first angle is between about 45 degrees and about 60 degrees.

11. The doser mechanism of claim 9, wherein the first angle is between about 60 degrees and about 85 degrees.

12. A packaging machine, comprising:
the doser mechanism of claim 1;
a material reservoir, the auger conveyor of the doser mechanism configured to draw material from the material reservoir;
a packaging supply device configured to supply a strip of packaging material that is folded to form a folded strip of packaging material that defines an open enclosure having an enclosure opening, wherein the doser mechanism is configured to supply the material into the open enclosure through the enclosure opening to at least partially fill a distal portion of the open enclosure with a particular amount of the material;
a sealing device configured to join opposing surfaces of the folded strip of packaging material to isolate the distal portion of the open enclosure from a remainder of the open enclosure that includes the enclosure opening such that the isolated distal portion of the open enclosure establishes a sealed enclosure that contains the particular amount of the material in the folded strip of packaging material; and
a cutting device configured to separate the sealed enclosure from a remainder of the folded strip of packaging material to establish an article of packaging that contains the particular amount of the material.

13. The packaging machine of claim 12, further comprising:
a plurality of doser mechanisms, the plurality of doser mechanisms including the doser mechanism, the plurality of doser mechanisms configured to supply separate, respective amounts of the material in parallel,
wherein the packaging supply device is configured to supply a plurality of strips of packaging material in parallel to the plurality of doser mechanisms, the plurality of strips of packaging material including the strip of packaging material.

14. A method for supplying a particular amount of a material via the doser mechanism of claim 1, the method comprising:
controlling the auger conveyor to operate to cause material to
move into the internal enclosure through the first opening,
move through the internal enclosure from the first end toward the second end along the central longitudinal axis, and move out of the internal enclosure through the second opening at the second end, such that the material moved through the second opening is caused to apply the applied force to the valve member of the check valve to cause the valve member to move from the rest position to the open position, such that the material exits the doser mechanism through the second opening; and controlling the auger conveyor to stop operation, such that the valve member of the check valve moves to the rest position to restrict movement of the material out of the internal enclosure through the second opening.

15. The method of claim 14, wherein the controlling the auger conveyor to stop operation is in response to a determination that the auger conveyor has operated for a particular period of time.

\* \* \* \* \*